United States Patent
Huang et al.

(10) Patent No.: US 10,225,311 B2
(45) Date of Patent: Mar. 5, 2019

(54) SIGNAL PROCESSING METHOD, APPARATUS, AND SYSTEM

(71) Applicant: Huawei Technologies Co., Ltd., Shenzhen (CN)

(72) Inventors: Huang Huang, Shenzhen (CN); Xi Yan, Shenzhen (CN); Sergio Benedetto, Turin (IT); Guido Montorsi, Turin (IT)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 15/098,141

(22) Filed: Apr. 13, 2016

(65) Prior Publication Data
US 2016/0234283 A1  Aug. 11, 2016

Related U.S. Application Data

(63) Continuation of application No. PCT/CN2013/085157, filed on Oct. 14, 2013.

(51) Int. Cl.
*H04B 7/0413* (2017.01)
*H04L 27/26* (2006.01)
(Continued)

(52) U.S. Cl.
CPC ........... *H04L 65/80* (2013.01); *H04B 7/0413* (2013.01); *H04J 11/00* (2013.01); *H04L 5/12* (2013.01);
(Continued)

(58) Field of Classification Search
CPC .......... H04B 7/02; H04B 7/04; H04B 7/0413; H04L 27/2662; H04L 27/2675
See application file for complete search history.

(56) References Cited

U.S. PATENT DOCUMENTS

| 7,313,194 B2 | 12/2007 | Bar-Ness et al. |
| 8,023,583 B2 | 9/2011 | Bar-Ness et al. |
| (Continued) | | |

FOREIGN PATENT DOCUMENTS

| CN | 101053172 A | 10/2007 |
| CN | 101771654 A | 7/2010 |
| (Continued) | | |

OTHER PUBLICATIONS

Andrews, J., et al., "Fundamentals of WiMAX:—Understanding Broadband Wireless Networking," Prentice Hall Communications Engineering and Emerging Technologies Series, © 2007 Pearson Education, Inc., 478 pages.
(Continued)

*Primary Examiner* — Scott M Sciacca
(74) *Attorney, Agent, or Firm* — Slater Matsil, LLP

(57) ABSTRACT

Embodiments of the present disclosure provide a signal processing method, an apparatus, and a system. The signal processing method includes acquiring a phase of each of transmit antennas when the $l^{th}$ OFDM data symbol is sent, and acquiring a phase of each of receive antennas when the $l^{th}$ OFDM data symbol is received. The method further includes compensating received signals of each of the receive antennas according to the phase of each of the transmit antennas when the $l^{th}$ OFDM data symbol is sent and the phase of each of the receive antennas when the $l^{th}$ OFDM data symbol is received, to obtain compensated signals of each receive antenna.

13 Claims, 4 Drawing Sheets

(51) Int. Cl.
H04L 29/06 (2006.01)
H04J 11/00 (2006.01)
H04L 5/12 (2006.01)
H04L 5/00 (2006.01)

(52) U.S. Cl.
CPC ........ *H04L 27/2662* (2013.01); *H04L 5/0048* (2013.01); *H04L 27/2675* (2013.01)

(56) References Cited

U.S. PATENT DOCUMENTS

| | | | | |
|---|---|---|---|---|
| 2005/0201268 | A1* | 9/2005 | Aoki | H04B 7/10 370/208 |
| 2006/0072511 | A1* | 4/2006 | Kent | H04L 25/0204 370/334 |
| 2006/0262868 | A1 | 11/2006 | Leshem | |
| 2007/0153927 | A1 | 7/2007 | Ma et al. | |
| 2008/0063012 | A1* | 3/2008 | Nakao | H04L 27/2657 370/500 |
| 2008/0280571 | A1* | 11/2008 | Rofougaran | H01Q 3/26 455/77 |
| 2010/0135203 | A1* | 6/2010 | Maru | H04B 7/04 370/328 |
| 2010/0166093 | A1 | 7/2010 | Tsai et al. | |
| 2012/0051476 | A1 | 3/2012 | Shi et al. | |
| 2013/0177095 | A1 | 7/2013 | Sun et al. | |
| 2015/0215071 | A1* | 7/2015 | Chinnici | H04L 25/0204 375/341 |
| 2016/0006489 | A1* | 1/2016 | Rydstrom | H04B 7/0413 375/267 |
| 2016/0142094 | A1* | 5/2016 | Papadopoulos | H04B 17/14 375/219 |

FOREIGN PATENT DOCUMENTS

| | | |
|---|---|---|
| CN | 102771654 A | 7/2010 |
| CN | 102025662 A | 4/2011 |
| CN | 102404033 B | 7/2014 |

OTHER PUBLICATIONS

Bittner, S., et al., "Exploiting Phase Noise Properties in the Design of MIMO-OFDM Receivers," IEEE Wireless Communications and Networking Conference, Mar. 31-Apr. 3, 2008, pp. 940-945.

Corvaja, R., et al., "Joint Channel and Phase Noise Compensation for OFDM in Fast-Fading Multipath Applications," IEEE Transactions on Vehicular Technology, vol. 58, No. 2, Feb. 2009, pp. 636-643.

Daneshrad, B., et al., "Phase Noise Suppression in MIMO OFDM Systems with Incoherent Phase Noise," The 2011 Military Communications Conference—Track 1—Waveforms and Signal Processing, pp. 42-44.

Ishaque, A., et al., "On the Efficient Mitigation of Phase Noise in MIMO-OFDM Receivers," 2012 International Symposium on Signals, Systems, and Electronics (ISSSE), Oct. 3-5, 2012, 6 pages.

Mehrpouyan, H., et al., "Joint Estimation of Channel and Oscillator Phase Noise in MIMO Systems," IEEE Transactions on Signal Processing, vol. 60, No. 9, Sep. 2012, pp. 4790-4807.

Paul, T., et al., "Wireless LAN Comes of Age: Understanding the IEEE 802.11n Amendment," IEEE Circuits and Systems Magazine, First Quarter 2008, pp. 28-54.

Pollet, T., et al., "Effect of Carrier Phase Jitter on Single-Carrier and Multi-Carrier QAM Systems," IEEE International Conference on Communications, Jun. 18-22, 1995, pp. 1046-1050.

Schenk, T., et al., "Influence and Suppression of Phase Noise in Multi-Antenna OFDM," 60th Vehicular Technology Conference, Sep. 26-29, 2004, pp. 1443-1447.

Syrjälä, V., et al., "Phase Noise Modelling and Mitigation Techniques in OFDM Communications Systems," Wireless Telecommunications Symposium, Apr. 22-24, 2009, 7 pages.

Zou, Q et al., "Compensation of Phase Noise in OFDM Wireless Systems," IEEE Transactions on Signal Processing, vol. 55, No. 11, Nov. 2007, pp. 5407-5424.

Zheng, Z-W et al., "Performance analysis on the spatially correlated MIMO-OFDM systems in the presence of phase noise and channel estimation error," Journal of Dalian Maritime University, vol. 33, No. 4, Nov. 2007, 5 pages.

* cited by examiner

SIGNAL PROCESSING METHOD, APPARATUS, AND SYSTEM

This Application is a continuation of International Application No. PCT/CN2013/085157, filed on Oct. 14, 2013, which is hereby incorporated by reference in its entirety.

TECHNICAL FIELD

The present disclosure relates to the communications field, and in particular, to a signal processing method, an apparatus, and a system.

BACKGROUND

MIMO-OFDM (Multiple Input Multiple Output-Orthogonal Frequency Division Multiplexing) is a signal transmission method that combines MIMO (Multiple Input Multiple Output) and OFDM (Orthogonal Frequency Division Multiplexing). In a MIMO-OFDM system, subcarriers are orthogonal, and multiple transmit antennas and multiple receive antennas are used to implement transmission and reception, that is, there are at least one transmit antenna and at least one receive antenna. Because MIMO-OFDM can increase a channel capacity, improve spectrum utilization, and also improve reliability of signal transmission, MIMO-OFDM currently has become a mainstream communications technology.

In the MIMO-OFDM system, phase noise is mainly produced by a crystal oscillator. The crystal oscillator is also referred to as crystal oscillator. According to different frequencies of crystal oscillators, degrees of signal distortion caused by generated phase noise are also different. For example, output of an ideal oscillator whose frequency is $f_0$ is $\alpha(t)=\cos(2\pi f_0 t)$, and output of an oscillator affected by phase noise is $\alpha(t)=\cos(2\pi f_0 t+\phi(t))$, where the phase $\phi(t)$ is generated randomly, noise caused by the phase $\phi(t)$ is the phase noise, and compensation for the phase noise is compensation for the phase $\phi(t)$. In an existing phase compensation method, it is considered by default that receive antennas share a common crystal oscillator (share a common oscillator) and transmit antennas share a common crystal oscillator, that is, all transmit antennas share a common oscillator and all receive antennas also share a common oscillator. However, in an actual MIMO-OFDM system, a case in which receive antennas or transmit antennas do not share a common oscillator may exist. When the existing phase noise compensation solution is applied to the MIMO-OFDM system in which receive antennas or transmit antennas do not share a common oscillator, precision of phase noise compensation for a received signal is relatively low, which may easily cause a case of signal distortion.

SUMMARY

Embodiments of the present disclosure provide a signal processing method, an apparatus, and a system, which can improve precision of phase noise compensation for a received signal and reduce cases of signal distortion.

To achieve the foregoing objective, the following technical solutions are used in the embodiments of the present disclosure. According to a first aspect, a signal processing method is provided, includes acquiring a phase of each of transmit antennas when the $l^{th}$ OFDM data symbol is sent; acquiring a phase of each of receive antennas when the $l^{th}$ OFDM data symbol is received; and compensating received signals of each of the receive antennas according to the phase of each of the transmit antennas when the $l^{th}$ OFDM data symbol is sent and the phase of each of the receive antennas when the $l^{th}$ OFDM data symbol is received, to obtain compensated signals of each receive antenna.

With reference to the first aspect, in a first implementable manner, before the acquiring a phase of each of transmit antennas when the $l^{th}$ OFDM data symbol is sent, the method further includes: acquiring sent signals on a pilot subcarrier when the $l^{th}$ OFDM data symbol is sent; and acquiring received signals on the pilot subcarrier when the $l^{th}$ OFDM data symbol is received.

With reference to the first implementable manner, in a second implementable manner, the acquiring a phase of each of transmit antennas when the $l^{th}$ OFDM data symbol is sent includes: calculating, according to the sent signals on the pilot subcarrier and the received signals on the pilot subcarrier and by using a transmit phase calculation formula, the phase of each of the transmit antennas when the $l^{th}$ OFDM data symbol is sent. The transmit phase calculation formula is:

$$\theta_m(l) = \theta_m(l-1) - \alpha \text{Im}\left[\sum_{k \in P}\left(e^{-j\theta_m(l-1)}(s_m^k(l))^* \sum_{n=1}^{N}(H_{nm}^k)^*(y_n^k(l)e^{-j\varphi_n^k(l-1)} - r_n^k(l))\right)\right],$$

where $\theta_m(l)$ in is a phase of the $m^{th}$ antenna of the transmit antennas when the $l^{th}$ OFDM data symbol is sent; $\varphi_n(l-1)$ is a phase of the $n^{th}$ antenna of the receive antennas when the $(l-1)^{th}$ OFDM data symbol is received; P is a pilot subcarrier set; n is an integer that is greater than or equal to 1 and is less than or equal to N; N is a quantity of the receive antennas; m is an integer that is greater than or equal to 1 and is less than or equal to M; M is a quantity of antennas of the transmit antennas; $\alpha$ is a preset coefficient; $y_n^k(l)$ is a received signal of the $n^{th}$ antenna of the receive antennas on the $k^{th}$ pilot subcarrier when the $l^{th}$ OFDM data symbol is received; $s_m^k(l)$ is a sent signal of the $m^{th}$ antenna of the transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the receive antennas and the $m^{th}$ antenna of the transmit antennas when the $l^{th}$ OFDM data symbol is transmitted; and $r_n^k(l)$ is a system parameter of the $n^{th}$ antenna of the receive antennas on the $k^{th}$ pilot subcarrier when the $l^{th}$ OFDM data symbol is received.

With reference to the first implementable manner, in a third implementable manner, the acquiring a phase of each of receive antennas when the $l^{th}$ OFDM data symbol is received includes: calculating, according to the sent signals on the pilot subcarrier and the received signals on the pilot subcarrier and by using a receive phase calculation formula, the phase of each of the receive antennas when the $l^{th}$ OFDM data symbol is received. The receive phase calculation formula is:

$$\varphi_n(l) = \varphi_n(l-1) - \alpha \text{Im}\left[\sum_{k \in P}(y_n^k(l)e^{-j\varphi_n(l-1)}(r_n^k(l))^*)\right]$$

where $\varphi_n(l)$ is a phase of the $n^{th}$ antenna of the receive antennas when the $l^{th}$ OFDM data symbol is received; P is a pilot subcarrier set; n is an integer that is greater than or equal to 1 and is less than or equal to N; N is a quantity of the receive antennas; m is an integer that is greater than or equal to 1 and is less than or equal to M; M is a quantity of antennas of the transmit antennas; α is a preset coefficient; $y_n^k(l)$ is a received signal of the $n^{th}$ antenna of the receive antennas on the $k^{th}$ pilot subcarrier when the $l^{th}$ OFDM data symbol is received; $s_m^k(l)$ is a sent signal of the $m^{th}$ antenna of the transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the receive antennas and the $m^{th}$ antenna of the transmit antennas when the $l^{th}$ OFDM data symbol is transmitted; and $r_n^k(l)$ is a system parameter of the $n^{th}$ antenna of the receive antennas on the $k^{th}$ pilot subcarrier when the $l^{th}$ OFDM data symbol is received.

With reference to the first aspect or the first to third implementable manners, in a fourth implementable manner, the compensating received signals of each of the receive antennas according to the phase of each of the transmit antennas when the $l^{th}$ OFDM data symbol is sent and the phase of each of the receive antennas when the $l^{th}$ OFDM data symbol is received, to obtain compensated signals of each receive antenna includes: obtaining, according to a compensation formula and by using the phase of each of the transmit antennas when the $l^{th}$ OFDM data symbol is sent, the phase of each of the receive antennas when the $l^{th}$ OFDM data symbol is received, and received signals when the $l^{th}$ OFDM data symbol is received, compensated signals when the $l^{th}$ OFDM data symbol is received. The compensation formula is:

$$Y^t(l) = \Phi(l) \cdot H^t \cdot \Theta(l) \cdot X^t(l) + ICI_l + z_l,$$

where $Y^t(l)$ is a matrix that includes a received signal of each of the receive antennas on the $t^{th}$ subcarrier when the $l^{th}$ OFDM data symbol is received; $\Phi(l)$ is a matrix that includes a phase of each of the receive antennas when the $l^{th}$ OFDM data symbol is received; $H^t$ is a channel between the receive and transmit antennas for the $t^{th}$ subcarrier when the $l^{th}$ OFDM data symbol is transmitted; $\Theta(l)$ is a matrix that includes a phase of each of the transmit antennas when the $l^{th}$ OFDM data symbol is sent; $X^t(l)$ is compensated signals on the $t^{th}$ subcarrier when the $l^{th}$ OFDM data symbol is received; $ICI_l$ is an inter-carrier interference matrix; and $z_l$ is a noise matrix.

According to a second aspect, a signal processing method is provided, includes acquiring a first set that includes phases of each of transmit antennas when all OFDM data symbols within a preset time period are sent; acquiring a second set that includes phases of each of receive antennas when all the OFDM data symbols within the preset time period are received; and compensating received signals of each of the receive antennas according to the first set and the second set, to obtain compensated signals of each receive antenna.

With reference to the second aspect, in a first implementable manner, before the acquiring a first set that includes phases of each of transmit antennas when all OFDM data symbols within a preset time period are sent, the method further includes: acquiring sent signals on a pilot subcarrier in each OFDM data symbol when all the OFDM data symbols within the preset time period are sent; and acquiring received signals on the pilot subcarrier in each OFDM data symbol when all the OFDM data symbols within the preset time period are received.

With reference to the first implementable manner, in a second implementable manner, the acquiring a first set that includes phases of each of transmit antennas when all OFDM data symbols within a preset time period are sent includes: acquiring, according to the sent signals on the pilot subcarrier in each OFDM data symbol when all the OFDM data symbols within the preset time period are sent, the first set that includes the phases of each of the transmit antennas when all the OFDM data symbols within the preset time period are sent. The transmit antennas send q OFDM data symbols within the preset time period, and when the $l^{th}$ OFDM data symbol of the q OFDM data symbols is sent, a phase $\theta_m(l)$ of the $m^{th}$ antenna of the transmit antennas satisfies:

$$\theta_m(l) = \theta_m(l-1) - \alpha \mathrm{Im}\left[\sum_{k \in P}\left(e^{-j\theta_m(l-1)}(s_m^k(l))^* \sum_{n=1}^{N}(H_{nm}^k)^*\left(y_n^k(l)e^{-j\varphi_n^k(l-1)} - r_n^k(l)\right)\right)\right],$$

where $\varphi_n(l-1)$ is a phase of the $n^{th}$ antenna of the receive antennas when the $(l-1)$th OFDM data symbol is received; P is a pilot subcarrier set; n is an integer that is greater than or equal to 1 and is less than or equal to N; N is a quantity of the receive antennas; m is an integer that is greater than or equal to 1 and is less than or equal to M; M is a quantity of antennas of the transmit antennas; α is a preset coefficient; $y_n^k(l)$ is a received signal of the $n^{th}$ antenna of the receive antennas on the $k^{th}$ pilot subcarrier when the $l^{th}$ OFDM data symbol is received; $s_m^k(l)$ is a sent signal of the $m^{th}$ antenna of the transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the receive antennas and the $m^{th}$ antenna of the transmit antennas when the $l^{th}$ OFDM data symbol is transmitted; and $r_n^k(l)$, is a system parameter of the $n^{th}$ antenna of the receive antennas on the $k^{th}$ pilot subcarrier when the $l^{th}$ OFDM data symbol is received.

With reference to the first implementable manner, in third implementable manner, the acquiring a second set that includes phases of each of receive antennas when all the OFDM data symbols within the preset time period are received includes: acquiring, according to the received signals on the pilot subcarrier in each OFDM data symbol when all the OFDM data symbols within the preset time period are received, the second set that includes the phases of each of the receive antennas when all the OFDM data symbols within the preset time period are received. The receive antennas receive q OFDM data symbols within the preset time period, and when the $l^{th}$ OFDM data symbol of the q OFDM data symbols is received, a phase $\varphi_n(l)$ of the $n^{th}$ antenna of the receive antennas satisfies:

$$\varphi_n(l) = \varphi_n(l-1) - \alpha \mathrm{Im}\left[\sum_{k \in P}(y_n^k(l)e^{-j\varphi_n(l-1)}(r_n^k(l))^*)\right],$$

where P is a pilot subcarrier set; n is an integer that is greater than or equal to 1 and is less than or equal to N; N is a quantity of the receive antennas; m is an integer that is greater than or equal to 1 and is less than or equal to M; M is a quantity of antennas of the transmit antennas; α is a preset coefficient; $y_n^k(l)$ is a received signal of the $n^{th}$ antenna of the receive antennas on the $k^{th}$ pilot subcarrier when the $l^{th}$ OFDM data symbol is received; $s_m^k(l)$ is a sent signal of the $m^{th}$ antenna of the transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the receive antennas and the $m^{th}$ antenna of the transmit antennas when the $l^{th}$ OFDM data symbol is transmitted; and $r_n^k(l)$ is a system parameter of the $n^{th}$ antenna of the receive antennas on the $k^{th}$ pilot subcarrier when the $l^{th}$ OFDM data symbol is received.

With reference to the second aspect or the first to third implementable manners, in a fourth implementable manner, the compensating received signals of each of the receive antennas according to the first set and the second set, to obtain compensated signals of each receive antenna includes: if the preset time period includes q OFDM data symbols, where q is an integer greater than or equal to 1, when the $l^{th}$ OFDM data symbol of the q OFDM data symbols is received, obtaining, according to a compensation formula and by using a phase of each of the transmit antennas that is in the first set when the $l^{th}$ OFDM data symbol is sent, a phase of each of the receive antennas that is in the second set when the $l^{th}$ OFDM data symbol is received, and received signals when the $l^{th}$ OFDM data symbol within the preset time period is received, compensated signals when the $l^{th}$ OFDM data symbol is received, where the compensation formula is:

$$Y^t(l) = \Phi(l) \cdot H^t \cdot \Theta(l) \cdot X^t(l) + ICI_l + z_l,$$

where l is an integer that is greater than or equal to 1 and is less than or equal to q; $\Phi(l)$ is a phase of each of the receive antennas when the $l^{th}$ OFDM data symbol is received; $H^t$ is a channel between the receive and transmit antennas for the $t^{th}$ subcarrier when the $l^{th}$ OFDM data symbol is transmitted; $\Theta(l)$ is a phase of each of the transmit antennas when the $l^{th}$ OFDM data symbol is sent; $X^t(l)$ is compensated signals on the $t^{th}$ subcarrier when the $l^{th}$ OFDM data symbol is received; $ICI_l$ is an inter-carrier interference matrix; and $z_l$ is a noise matrix.

According to a third aspect, a receiving apparatus is provided and includes a first acquiring unit, configured to acquire a phase of each of transmit antennas when the $l^{th}$ OFDM data symbol is sent. The first acquiring unit is further configured to acquire a phase of each of receive antennas when the $l^{th}$ OFDM data symbol is received. A processing unit is configured to compensate received signals of each of the receive antennas according to the phase of each of the transmit antennas when the $l^{th}$ OFDM data symbol is sent and the phase of each of the receive antennas when the $l^{th}$ OFDM data symbol is received, to obtain compensated signals of each receive antenna.

With reference to the third aspect, in a first implementable manner, the receiving apparatus further includes a second acquiring unit configured to acquire sent signals on a pilot subcarrier when the $l^{th}$ OFDM data symbol is sent. The second acquiring unit is further configured to acquire received signals on the pilot subcarrier when the $l^{th}$ OFDM data symbol is received.

With reference to the first implementable manner, in a second implementable manner, the first acquiring unit is specifically configured to: calculate, according to the sent signals on the pilot subcarrier and the received signals on the pilot subcarrier and by using a transmit phase calculation formula, the phase of each of the transmit antennas when the $l^{th}$ OFDM data symbol is sent. The transmit phase calculation formula is:

$$\theta_m(l) = \theta_m(l-1) - \alpha \text{Im}\left[\sum_{k \in P} \left(e^{-j\theta_m(l-1)}(s_m^k(l))^* \sum_{n=1}^{N}(H_{nm}^k)^*\left(y_n^k(l)e^{-j\varphi_n^k(l-1)} - r_n^k(l)\right)\right)\right],$$

where $\theta_m(l)$ is a phase of the $m^{th}$ antenna of the transmit antennas when the $l^{th}$ OFDM data symbol is sent; $\varphi_n(l-1)$ is a phase of the $n^{th}$ antenna of the receive antennas when the $(l-1)^{th}$ OFDM data symbol is received; P is a pilot subcarrier set; n is an integer that is greater than or equal to 1 and is less than or equal to N; N is a quantity of the receive antennas; m is an integer that is greater than or equal to 1 and is less than or equal to M; M is a quantity of antennas of the transmit antennas; $\alpha$ is a preset coefficient; $y_n^k(l)$ is a received signal of the $n^{th}$ antenna of the receive antennas on the $k^{th}$ pilot subcarrier when the $l^{th}$ OFDM data symbol is received; $s_m^k(l)$ is a sent signal of the $m^{th}$ antenna of the transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the receive antennas and the $m^{th}$ antenna of the transmit antennas when the $l^{th}$ OFDM data symbol is transmitted; and $r_n^k(l)$ is a system parameter of the $n^{th}$ antenna of the receive antennas on the $k^{th}$ pilot subcarrier when the $l^{th}$ OFDM data symbol is received.

With reference to the first implementable manner, in a third implementable manner, the first acquiring unit is specifically configured to: calculate, according to the sent signals on the pilot subcarrier and the received signals on the pilot subcarrier and by using a receive phase calculation formula, the phase of each of the receive antennas when the $l^{th}$ OFDM data symbol is received. The receive phase calculation formula is:

$$\varphi_n(l) = \varphi_n(l-1) - \alpha \text{Im}\left[\sum_{k \in P}(y_n^k(l)e^{-j\varphi_n(l-1)}(r_n^k(l))^*)\right],$$

where $\varphi_n(l)$ is a phase of the nth antenna of the receive antennas when the $l^{th}$ OFDM data symbol is received; P is a pilot subcarrier set; n is an integer that is greater than or equal to 1 and is less than or equal to N; N is a quantity of the receive antennas; m is an integer that is greater than or equal to 1 and is less than or equal to M; M is a quantity of antennas of the transmit antennas; $\alpha$ is a preset coefficient; $y_n^k(l)$ is a received signal of the $n^{th}$ antenna of the receive antennas on the $k^{th}$ pilot subcarrier when the $l^{th}$ OFDM data symbol is received; $s_m^k(l)$ is a sent signal of the $m^{th}$ antenna of the transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the receive antennas and the $m^{th}$ antenna of the transmit antennas when the $l^{th}$ OFDM data symbol is transmitted; and $r_n^k(l)$, is a system parameter of the $n^{th}$ antenna of the receive antennas on the $k^{th}$ pilot subcarrier when the $l^{th}$ OFDM data symbol is received.

With reference to the third aspect or the first to third implementable manners, in a fourth implementable manner, the processing unit is specifically configured to: obtain, according to a compensation formula and by using the phase of each of the transmit antennas when the $l^{th}$ OFDM data symbol is sent, the phase of each of the receive antennas when the $l^{th}$ OFDM data symbol is received, and received signals when the $l^{th}$ OFDM data symbol is received, compensated signals when the $l^{th}$ OFDM data symbol is received. The compensation formula is:

$$Y^t(l)=\Phi(l)\cdot H^t\cdot\Theta(l)\cdot X^t(l)+ICI_l+z_l,$$

where $Y^t(l)$ is a matrix that includes a received signal of each of the receive antennas on the $t^{th}$ subcarrier when the $l^{th}$ OFDM data symbol is received; $\Phi(l)$ is a matrix that includes a phase of each of the receive antennas when the $l^{th}$ OFDM data symbol is received; $H^t$ is a channel between the receive and transmit antennas for the $t^{th}$ subcarrier when the $l^{th}$ OFDM data symbol is transmitted; $\Theta(l)$ is a matrix that includes a phase of each of the transmit antennas when the $l^{th}$ OFDM data symbol is sent; $X^t(l)$ is compensated signals on the $t^{th}$ subcarrier when the $l^{th}$ OFDM data symbol is received; $ICI_l$ is an inter-carrier interference matrix; and $z_l$ is a noise matrix.

According to a fourth aspect, a communications system is provided, including: any receiving apparatus described in the foregoing; and a sending apparatus, where the sending apparatus is configured to send a signal to the receiving apparatus.

According to a fifth aspect, a receiving apparatus is provided, including: a first acquiring unit, configured to acquire a first set that includes phases of each of transmit antennas when all OFDM data symbols within a preset time period are sent. The first acquiring unit is further configured to acquire a second set that includes phases of each of receive antennas when all the OFDM data symbols within the preset time period are received. A processing unit is configured to compensate received signals of each of the receive antennas according to the first set and the second set, to obtain compensated signals of each receive antenna.

With reference to the fifth aspect, in a first implementable manner, the receiving apparatus further includes a second acquiring unit configured to acquire sent signals on a pilot subcarrier in each OFDM data symbol when all the OFDM data symbols within the preset time period are sent. The second acquiring unit is further configured to acquire received signals on the pilot subcarrier in each OFDM data symbol when all the OFDM data symbols within the preset time period are received.

With reference to the first implementable manner, in a second implementable manner, the first acquiring unit is specifically configured to: acquire, according to the sent signals on the pilot subcarrier in each OFDM data symbol when all the OFDM data symbols within the preset time period are sent, the first set that includes the phases of each of the transmit antennas when all the OFDM data symbols within the preset time period are sent. The transmit antennas send q OFDM data symbols within the preset time period, and when the $l^{th}$ OFDM data symbol of the q OFDM data symbols is sent, a phase $\theta_m(l)$ of the $m^{th}$ antenna of the transmit antennas satisfies:

$$\theta_m(l) = \theta_m(l-1) - \alpha\text{Im}\left[\sum_{k\in P}\left(e^{-j\theta_m(l-1)}(s_m^k(l))^*\sum_{n=1}^{N}(H_{nm}^k)^*(y_n^k(l)e^{-j\varphi_n^k(l-1)} - r_n^k(l))\right)\right],$$

where $\varphi_n(l-1)$ is a phase of the $n^{th}$ antenna of the receive antennas when the $(l-1)^{th}$ OFDM data symbol is received; P is a pilot subcarrier set; n is an integer that is greater than or equal to 1 and is less than or equal to N; N is a quantity of the receive antennas; m is an integer that is greater than or equal to 1 and is less than or equal to M; M is a quantity of antennas of the transmit antennas; $\alpha$ is a preset coefficient; $y_n^k(l)$ is a received signal of the $n^{th}$ antenna of the receive antennas on the $k^{th}$ pilot subcarrier when the $l^{th}$ OFDM data symbol is received; $s_m^k(l)$ is a sent signal of the $m^{th}$ antenna of the transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the receive antennas and the $m^{th}$ antenna of the transmit antennas when the $l^{th}$ OFDM data symbol is transmitted; and $r_n^k(l)$ is a system parameter of the $n^{th}$ antenna of the receive antennas on the $k^{th}$ pilot subcarrier when the $l^{th}$ OFDM data symbol is received.

With reference to the first implementable manner, in a third implementable manner, the first acquiring unit is specifically configured to: acquire, according to the received signals on the pilot subcarrier in each OFDM data symbol when all the OFDM data symbols within the preset time period are received, the second set that includes the phases of each of the receive antennas when all the OFDM data symbols within the preset time period are received. The receive antennas receive q OFDM data symbols within the preset time period, and when the $l^{th}$ OFDM data symbol of the q OFDM data symbols is received, a phase $\varphi_n(l)$ of the $n^{th}$ antenna of the receive antennas satisfies:

$$\varphi_n(l) = \varphi_n(l-1) - \alpha\text{Im}\left[\sum_{k\in P}(y_n^k(l)e^{-j\varphi_n(l-1)}(r_n^k(l))^*)\right],$$

where P is a pilot subcarrier set; n is an integer that is greater than or equal to 1 and is less than or equal to N; N is a quantity of the receive antennas; m is an integer that is greater than or equal to 1 and is less than or equal to M; M is a quantity of antennas of the transmit antennas; $\alpha$ is a preset coefficient; $y_n^k(l)$ is a received signal of the $n^{th}$ antenna of the receive antennas on the $k^{th}$ pilot subcarrier when the $l^{th}$ OFDM data symbol is received; $s_m^k(l)$ is a sent signal of the $m^{th}$ antenna of the transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the receive antennas and the $m^{th}$ antenna of the transmit antennas when the $l^{th}$ OFDM data symbol is transmitted; and $r_n^k(l)$ is a system parameter of the $n^{th}$ antenna of the receive antennas on the $k^{th}$ pilot subcarrier when the $l^{th}$ OFDM data symbol is received.

With reference to the fifth aspect or the first to third implementable manners, in a fourth implementable manner, the processing unit is specifically configured to: if the preset time period includes q OFDM data symbols, where q is an integer greater than or equal to 1, when the $l^{th}$ OFDM data symbol of the q OFDM data symbols is received, obtain, according to a compensation formula and by using a phase of each of the transmit antennas that is in the first set when the $l^{th}$ OFDM data symbol is sent, a phase of each of the receive antennas that is in the second set when the $l^{th}$ OFDM data symbol is received, and received signals when the $l^{th}$ OFDM data symbol within the preset time period is received, compensated signals when the $l^{th}$ OFDM data symbol is received, where the compensation formula is:

$$Y^t(l)=\Phi(l)\cdot H^t\cdot\Theta(l)\cdot X^t(l)+ICI_l+z_l,$$

where l is an integer that is greater than or equal to 1 and is less than or equal to q; $\Phi(l)$ is a phase of each of the receive antennas when the $l^{th}$ OFDM data symbol is received; $H^t$ is a channel between the receive and transmit antennas for the $t^{th}$ subcarrier when the $l^{th}$ OFDM data symbol is transmitted; Θ(l) is a phase of each of the transmit antennas when the $l^{th}$ OFDM data symbol is sent; X'(l) is compensated signals on the $t^{th}$ subcarrier when the $l^{th}$ OFDM data symbol is received; $ICI_l$ is an inter-carrier interference matrix; and $z_l$ is a noise matrix.

According to a sixth aspect, a communications system is provided, including: any receiving apparatus described in the foregoing; and a sending apparatus, where the sending apparatus is configured to send a signal to the receiving apparatus.

The embodiments of the present disclosure provide a signal processing method, an apparatus, and a system, where a phase of each of transmit antennas and receive antennas is acquired; and received signals of each of the receive antennas are compensated according to the phase of each of the transmit antennas and the receive antennas, to obtain compensated signals of each receive antenna. In this way, phase noise compensation is performed on received signals of the receive antennas by using the phase of each of the transmit antennas and the receive antennas, to obtain compensated signals. Compared with the prior art, the present disclosure improves precision of phase noise compensation, and effectively reduces cases of signal distortion.

BRIEF DESCRIPTION OF THE DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
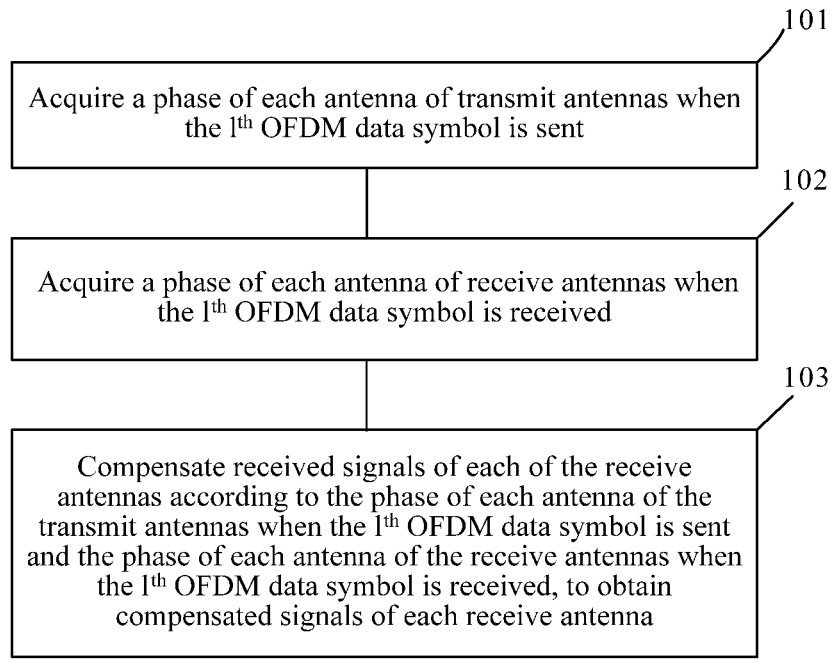
FIG. 1 is a flowchart of a signal processing method according to an embodiment of the present disclosure.

As shown in FIG. 1, an embodiment of the present disclosure provides a signal processing method, including:

Step 101: Acquire a phase of each of transmit antennas when the $l^{th}$ OFDM data symbol is sent.

In a MIMO-OFDM system in which transmit antennas do not share a common oscillator, when the transmit antennas send signals, one OFDM data symbol is sent as one data packet, and each time an OFDM data symbol is sent, each of the transmit antennas has a different phase.

Step 102: Acquire a phase of each of receive antennas when the $l^{th}$ OFDM data symbol is received.

In a MIMO-OFDM system in which receive antennas do not share a common oscillator, when the receive antennas receive signals, one OFDM data symbol is received as one data packet, and each time an OFDM data symbol is received, each of the receive antennas has a different phase.

Step 103: Compensate received signals of each of the receive antennas according to the phase of each of the transmit antennas when the $l^{th}$ OFDM data symbol is sent and the phase of each of the receive antennas when the $l^{th}$ OFDM data symbol is received, to obtain compensated signals of each receive antenna.

Specifically, compensated signals X'(l) when the $l^{th}$ OFDM data symbol is received are obtained according to a compensation formula and by using the phase of each of the transmit antennas when the $l^{th}$ OFDM data symbol is sent, the phase of each of the receive antennas when the $l^{th}$ OFDM data symbol is received, and received signals when the $l^{th}$ OFDM data symbol is received, where the compensation formula is:

$$Y^t(l) = \Phi(l) \cdot H^t \cdot \Theta(l) \cdot X^t(l) + ICI_l + z_l,$$

where Y'(l) is a matrix that includes a received signal of each of the receive antennas on the $t^{th}$ subcarrier when the $l^{th}$ OFDM data symbol is received, where specifically, $$Y^t(l) = \begin{bmatrix} y_1^t(l) \\ M \\ y_N^t(l) \end{bmatrix},$$

and $y_1^t(l)$ to $y_N^t(l)$ respectively represent received signals of the first to $N^{th}$ antennas of the receive antennas on the $t^{th}$ subcarrier when the $l^{th}$ OFDM data symbol is received; Φ(l) is a matrix that includes a phase of each of the receive antennas when the $l^{th}$ OFDM data symbol is received, where specifically, $$\Phi(l) = \begin{bmatrix} e^{j\varphi_1(l)} & \cdots & 0 \\ \vdots & \ddots & \vdots \\ 0 & \cdots & e^{j\varphi_N(l)} \end{bmatrix},$$

and $\varphi_1(l)$ to $\varphi_N(l)$ respectively represent phases of the first to $N^{th}$ antennas of the receive antennas when the $l^{th}$ OFDM data symbol is received; $H^t$ is a channel between the receive and transmit antennas for the $t^{th}$ subcarrier when the $l^{th}$ OFDM data symbol is received; Θ(l) is a matrix that includes a phase of each of the transmit antennas when the $l^{th}$ OFDM data symbol is sent, where specifically, $$\Theta(l) = \begin{bmatrix} e^{j\theta_1(l)} & \cdots & 0 \\ \vdots & \ddots & \vdots \\ 0 & \cdots & e^{j\theta_M(l)} \end{bmatrix},$$

and $\theta_1(l)$ to $\theta_M(l)$ respectively represent phases of the first to Nth antennas of the transmit antennas when the $l^{th}$ OFDM data symbol is sent; $X^t(l)$ is compensated signals on the $t^{th}$ subcarrier when the $l^{th}$ OFDM data symbol is received, where specifically, $$X^t(l) = \begin{bmatrix} x_1^t(l) \\ \vdots \\ x_M^t(l) \end{bmatrix},$$

and $x_1^t(l)$ to $x_M^t(l)$ respectively represent compensated signals of the first to $M^{th}$ antennas on the $t^{th}$ subcarrier when the $l^{th}$ OFDM data symbol is received; $ICI_l$ is an inter-carrier interference matrix, where in an actual application, the inter-carrier interference matrix may include main inter-carrier interference and residual inter-carrier interference; and $z_l$ is a noise matrix.

Further, the phase of each of the transmit antennas when the $l^{th}$ OFDM data symbol is sent, the phase of each of the receive antennas when the $l^{th}$ OFDM data symbol is received, and the received signals when the $l^{th}$ OFDM data symbol is received are substituted into the compensation formula; in this way, the compensated signals $X^t(l)$ when the $l^{th}$ OFDM data symbol is received can be obtained, and $X^t(l)$ is compensated signals finally obtained by a receiving apparatus when the $l^{th}$ OFDM data symbol is received.

In this way, in a MIMO-OFDM system in which receive antennas or transmit antennas do not share a common oscillator, phase noise compensation is performed on received signals of the receive antennas by using a phase of each of the transmit antennas when the $l^{th}$ OFDM data symbol is sent and a phase of each of the receive antennas when the $l^{th}$ OFDM data symbol is received, to obtain compensated signals. Compared with the prior art, the present disclosure improves precision of phase noise compensation, and effectively reduces cases of signal distortion.

Further, before step 101, sent signals on a pilot subcarrier when the $l^{th}$ OFDM data symbol is sent and received signals on the pilot subcarrier when the $l^{th}$ OFDM data symbol is received need to be acquired first, where the pilot subcarrier is a subcarrier agreed on by a sending apparatus and the receiving apparatus in advance, and the sent signals of the sending apparatus on the pilot subcarrier are known in the receiving apparatus.

Specifically, when the $l^{th}$ OFDM data symbol is sent, the phase of each of the transmit antennas when the $l^{th}$ OFDM data symbol is sent is calculated by using a transmit phase calculation formula and according to the sent signals on the pilot subcarrier when the $l^{th}$ OFDM data symbol is sent and the received signals on the pilot subcarrier when the $l^{th}$ OFDM data symbol is received, where the transmit phase calculation formula is:

$$\theta_m(l) = \theta_m(l-1) - \alpha \operatorname{Im}\left[\sum_{k \in P}\left(e^{-j\theta_m(l-1)}(s_m^k(l))^* \sum_{n=1}^{N}(H_{nm}^k)^*(y_n^k(l)e^{-j\varphi_n^k(l-1)} - r_n^k(l))\right)\right],$$

where $\theta_m(l)$ is a phase of the $m^{th}$ antenna of the transmit antennas when the $l^{th}$ OFDM data symbol is sent, where an initial value $\theta_m(0)$ is a value preset by a system and is usually set to 0; $\varphi_n(l-1)$ is a phase of the $n^{th}$ antenna of the receive antennas when the $(l-1)^{th}$ OFDM data symbol is received, where for the transmit antennas when the $l^{th}$ OFDM data symbol is received, $\varphi_n(l-1)$ is known and can be calculated by using a receive phase calculation formula when the $(l-1)^{th}$ OFDM data symbol is received, and an initial value $\varphi_n(0)$ is a value preset by the system and is usually set to 0; $\alpha$ is an empirical value and may be set to different values such as $10^{-6}$ or $10^{-4}$ according to different systems; Im is a mathematical symbol and indicates that an imaginary part of a value in brackets behind Im is used; P is a pilot subcarrier set, that is, when a summation operation is performed, the operation is performed only for a pilot subcarrier; e is a natural constant, a value of e is about 2.71828, $e^{-j\varphi_n(l-1)}$ in the formula is a complex number expression manner, and a specific meaning of $e^{-j\varphi_n(l-1)}$ is $e^{-j\varphi_n(l-1)} = \cos[\varphi_n(l-1)] - j\sin[\varphi_n(l-1)]$, where j is an imaginary unit; n is an integer that is greater than or equal to 1 and is less than or equal to N; N is a quantity of the receive antennas; m is an integer that is greater than or equal to 1 and is less than or equal to M; M is a quantity of antennas of the transmit antennas; $y_n^k(l)$ is a received signal of the $n^{th}$ antenna of the receive antennas on the $k^{th}$ pilot subcarrier when the $l^{th}$ OFDM data symbol is received; $s_m^k(l)$ is a sent signal of the $m^{th}$ antenna of the transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the receive antennas and the $m^{th}$ antenna of the transmit antennas; and $(r_n^k(l))^*$ refers to an adjoint matrix of the matrix $r_n^k(l)$, where the matrix $r_n^k(l)$ is a system parameter of the $n^{th}$ antenna of the receive antennas on the $k^{th}$ pilot subcarrier when the $l^{th}$ OFDM data symbol is received; $r_n^k(l)$ is obtained through calculation, and a calculation formula of $r_n^k(l)$ is $$r_n^k(l) = \sum_{m=1}^{M} H_{nm} e^{j\theta_m^k(l-1)} s_m^k(l),$$

where $s_m^k(l)$ is the sent signal of the $m^{th}$ antenna of the transmit antennas on the $k^{th}$ pilot subcarrier when the $l^{th}$ OFDM data symbol is sent, $\theta_m^k(l-1)$ is a phase of the $m^{th}$ antenna of the transmit antennas when the $l-1^{th}$ OFDM data symbol is sent, and $H_{nm}^k$ is the channel over which the $k^{th}$ pilot subcarrier is sent between the $n^{th}$ antenna of the receive antennas and the $m^{th}$ antenna of the transmit antennas.

Specifically, when the receive antennas receive signals, one OFDM data symbol is received as one data packet. When the $l^{th}$ OFDM data symbol is received, the phase of each of the receive antennas when the $l^{th}$ OFDM data symbol is received is calculated by using a receive phase calculation formula and according to the sent signals on the pilot subcarrier when the $l^{th}$ OFDM data symbol is sent and the received signals on the pilot subcarrier when the $l^{th}$ OFDM data symbol is received, where the receive phase calculation formula is:

$$\varphi_n(l) = \varphi_n(l-1) - \alpha \operatorname{Im}\left[\sum_{k \in P}(y_n^k(l)e^{-j\varphi_n(l-1)}(r_n^k(l))^*)\right],$$

where $\varphi_n(l)$ is a phase of the $n^{th}$ antenna of the receive antennas when the $l^{th}$ OFDM data symbol is received, where an initial value $\varphi_n(0)$ is a value preset by a system and is usually set to 0; $\alpha$ is an empirical value and may be set to different values such as $10^{-6}$ or $10^{-4}$ according to different systems; Im is a mathematical symbol and indicates that an imaginary part of a value in brackets behind Im is used; P is a pilot subcarrier set, that is, when a summation operation is performed, the operation is performed only for a pilot subcarrier; e is a natural constant, a value of e is about 2.71828, $e^{-j\varphi_n(l-1)}$ in the formula is a complex number expression manner, and a specific meaning of $e^{-j\varphi_n(l-1)}$ is $e^{-j\varphi_n(l-1)}=\cos[\varphi_n(l-1)]-j\sin[\varphi_n(l-1)]$, where j is an imaginary unit; n is an integer that is greater than or equal to 1 and is less than or equal to N; N is a quantity of the receive antennas; m is an integer that is greater than or equal to 1 and is less than or equal to M; M is a quantity of antennas of the transmit antennas; $y_n^k(l)$ is a received signal of the $n^{th}$ antenna of the receive antennas on the $k^{th}$ pilot subcarrier when the $l^{th}$ OFDM data symbol is received; $s_m^k(l)$ is a sent signal of the $m^{th}$ antenna of the transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the receive antennas and the $m^{th}$ antenna of the transmit antennas; and $(r_n^k(l))^*$ refers to an adjoint matrix of the matrix $r_n^k(l)$, where the matrix $r_n^k(l)$ is a system parameter of the $n^{th}$ antenna of the receive antennas on the $k^{th}$ pilot subcarrier when the $l^{th}$ OFDM data symbol is received; $r_n^k(l)$ is obtained through calculation, and a calculation formula of $r_n^k(l)$ is $$r_n^k(l) = \sum_{m=1}^{M} H_{nm} e^{j\theta_m^k(l-1)} s_m^k(l),$$

where $s_m^k(l)$ is the sent signal of the $m^{th}$ antenna of the transmit antennas on the $k^{th}$ pilot subcarrier when the $l^{th}$ OFDM data symbol is sent, $\theta_m^k(l-1)$ is a phase of the $m^{th}$ antenna of the transmit antennas when the $l-1^{th}$ OFDM data symbol is sent, and $H_{nm}^k$ is the channel over which the $k^{th}$ pilot subcarrier is sent between the $n^{th}$ antenna of the receive antennas and the $m^{th}$ antenna of the transmit antennas.

l is an integer that is greater than or equal to 1 and is less than or equal to g, and g is a total quantity of OFDM data symbols received by the receive antennas.

It should be noted that this embodiment of the present disclosure is described by using an example of a system in which transmit antennas do not share a common oscillator and receive antennas do not share a common oscillator; in an actual application, the signal processing method may also be applied to a system in which transmit antennas share a common oscillator and receive antennas share a common oscillator, which is not described in detail in the present disclosure.

The phase noise compensation method in the present disclosure is usually applied to a high-speed backhaul network, a high-speed point-to-point network, a Wireless Fidelity technology, Worldwide Interoperability for Microwave Access, or Long Term Evolution.

According to the signal processing method provided in this embodiment of the present disclosure, phase noise compensation is performed on received signals of the receive antennas when the $l^{th}$ OFDM data symbol is received by using a phase of each of the transmit antennas when the $l^{th}$ OFDM data symbol is sent and a phase of each of the receive antennas when the $l^{th}$ OFDM data symbol is received, to obtain compensated signals. Compared with the prior art, the present disclosure improves precision of phase noise compensation, and effectively reduces cases of signal distortion.

Figure 2:
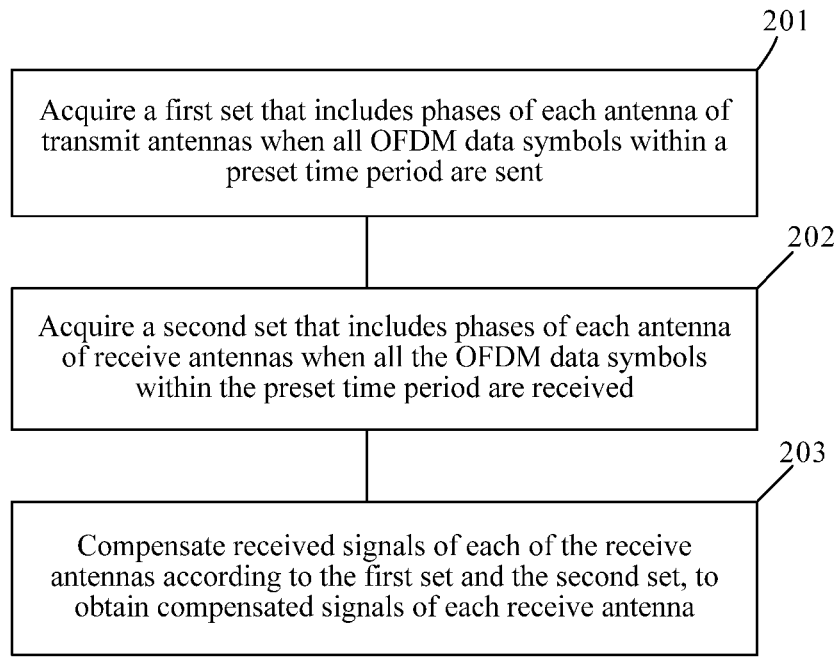
FIG. 2 is a flowchart of another signal processing method according to an embodiment of the present disclosure.

As shown in FIG. 2, an embodiment of the present disclosure provides a signal processing method, including:

Step 201: Acquire a first set that includes phases of each of transmit antennas when all OFDM data symbols within a preset time period are sent.

When the transmit antennas send signals, one OFDM data symbol is sent as one data packet. Within a preset time period, multiple OFDM data symbols may be sent, and each time an OFDM data symbol is sent, each of the transmit antennas has a different phase. Therefore, within the preset time period, phases of each of the transmit antennas form a phase set that is referred to as a first set.

Step 202: Acquire a second set that includes phases of each of receive antennas when all the OFDM data symbols within the preset time period are received.

When the receive antennas receive signals, one OFDM data symbol is received as one data packet. Within the preset time period, multiple OFDM data symbols may be received, and each time an OFDM data symbol is received, each of the receive antennas has a different phase. Therefore, within the preset time period, phases of each of the receive antennas form a phase set that is referred to as a second set.

Step 203: Compensate received signals of each of the receive antennas according to the first set and the second set, to obtain compensated signals of each receive antenna.

Specifically, if the preset time period includes q OFDM data symbols, where q is an integer greater than or equal to 1, when the $l^{th}$ OFDM data symbol of the q OFDM data symbols is received, compensated signals when the $l^{th}$ OFDM data symbol is received are obtained according to a compensation formula and by using a phase of each of the transmit antennas that is in the first set when the $l^{th}$ OFDM data symbol is sent, a phase of each of the receive antennas that is in the second set when the $l^{th}$ OFDM data symbol is received, and received signals when the $l^{th}$ OFDM data symbol within the preset time period is received, where the compensation formula is:

$$Y^t(l)=\Phi(l)\cdot H^t\cdot\Theta(l)\cdot X^t(l)+ICI_l+z_l,$$

where $Y^t(l)$ is a matrix that includes a received signal of each of the receive antennas on the $t^{th}$ subcarrier when the $l^{th}$ OFDM data symbol is received, where specifically, $$Y^t(l) = \begin{bmatrix} y_1^t(l) \\ M \\ y_N^t(l) \end{bmatrix},$$

and $y_1^t(l)$ to $y_N^t(l)$ respectively represent received signals of the first to $N^{th}$ antennas of the receive antennas on the $t^{th}$ subcarrier when the $l^{th}$ OFDM data symbol is received; $\Phi(l)$ is a matrix that includes a phase of each of the receive antennas when the $l^{th}$ OFDM data symbol is received, where specifically, $$\Phi(l) = \begin{bmatrix} e^{j\varphi_1(l)} & \cdots & 0 \\ \vdots & \ddots & \vdots \\ 0 & \cdots & e^{j\varphi_N(l)} \end{bmatrix},$$

and $\varphi_1(l)$ to $\varphi_N(l)$ respectively represent phases of the first to Nth antennas of the receive antennas when the $l^{th}$ OFDM data symbol is received; $H^t$ is a channel between the receive and transmit antennas for the $t^{th}$ subcarrier when the $l^{th}$ OFDM data symbol is received; $\Theta(l)$ is a matrix that includes a phase of each of the transmit antennas when the $l^{th}$ OFDM data symbol is sent, where specifically, $$\Theta(l) = \begin{bmatrix} e^{j\theta_1(l)} & \cdots & 0 \\ \vdots & \ddots & \vdots \\ 0 & \cdots & e^{j\theta_M(l)} \end{bmatrix},$$

and $\theta_1(l)$ to $\theta_M(l)$ respectively represent phases of the first to Nth antennas of the transmit antennas when the $l^{th}$ OFDM data symbol is sent; $X^t(l)$ is compensated signals on the $t^{th}$ subcarrier when the $l^{th}$ OFDM data symbol is received, where specifically, $$X^t(l) = \begin{bmatrix} x_1^t(l) \\ \vdots \\ x_M^t(l) \end{bmatrix},$$

and $x_1^t(l)$ to $x_M^t(l)$ respectively represent compensated signals of the first to $M^{th}$ antennas on the $t^{th}$ subcarrier when the $l^{th}$ OFDM data symbol is received; $ICI_l$ is an inter-carrier interference matrix, where in an actual application, the inter-carrier interference matrix may include main inter-carrier interference and residual inter-carrier interference; and $z_l$ is a noise matrix.

Further, the phase of each of the transmit antennas when the $l^{th}$ OFDM data symbol is sent, the phase of each of the receive antennas when the $l^{th}$ OFDM data symbol is received, and the received signals when the $l^{th}$ OFDM data symbol is received are substituted into the compensation formula; in this way, the compensated signals $X^t(l)$ when the $l^{th}$ OFDM data symbol is received can be obtained, and $X^t(l)$ is compensated signals finally obtained by a receiving apparatus when the $l^{th}$ OFDM data symbol is received.

In this way, in a MIMO-OFDM system in which receive antennas or transmit antennas do not share a common oscillator, phase noise compensation is performed on received signals of the receive antennas within the preset time period by using the first set and the second set, to obtain compensated signals. Compared with the prior art, the present disclosure improves precision of phase noise compensation, and effectively reduces cases of signal distortion.

Further, before step 201, sent signals on a pilot subcarrier in each OFDM data symbol when all the OFDM data symbols within the preset time period are sent, and received signals on the pilot subcarrier in each OFDM data symbol when all the OFDM data symbols within the preset time period are received need to be acquired first.

Specifically, the first set that includes the phases of each of the transmit antennas when all the OFDM data symbols within the preset time period are sent is acquired according to the sent signals on the pilot subcarrier in each OFDM data symbol when all the OFDM data symbols within the preset time period are sent.

Assuming that within the preset time period, the transmit antennas send a total of q OFDM data symbols and the receive antennas receive a total of q OFDM data symbols, when the $l^{th}$ OFDM data symbol of the q OFDM data symbols is sent, a phase $\theta_m(l)$ of the $m^{th}$ antenna of the transmit antennas satisfies:

$$\theta_m(l) = \theta_m(l-1) - \alpha \text{Im}\left[\sum_{k\in P}\left(e^{-j\theta_m(l-1)}(s_m^k(l))^*\sum_{n=1}^{N}(H_{nm}^k)^*\left(y_n^k(l)e^{-j\varphi_n^k(l-1)} - r_n^k(l)\right)\right)\right],$$

where $\varphi_n(l-1)$ is a phase of the $n^{th}$ antenna of the receive antennas when the $(l-1)^{th}$ OFDM data symbol is received, where for the transmit antennas when the $l^{th}$ OFDM data symbol is received, $\varphi_n(l-1)$ is known and can be calculated by using a receive phase calculation formula when the $(l-1)^{th}$ OFDM data symbol is received, and an initial value $\varphi_n(0)$ is a value preset by a system and is usually set to 0; $\alpha$ is an empirical value and may be set to different values such as $10^{-6}$ or $10^{-4}$ according to different systems; Im is a mathematical symbol and indicates that an imaginary part of a value in brackets behind Im is used; P is a pilot subcarrier set, that is, when a summation operation is performed, the operation is performed only for a pilot subcarrier; e is a natural constant, a value of e is about 2.71828, $e^{-j\varphi_n(l-1)}$ in the formula is a complex number expression manner, and a specific meaning of $e^{-j\varphi_n(l-1)}$ is $e^{-j\varphi_n(l-1)} = \cos[\varphi_n(l-1)] - j\sin[\varphi_n(l-1)]$, where j is an imaginary unit; n is an integer that is greater than or equal to 1 and is less than or equal to N; N is a quantity of the receive antennas; m is an integer that is greater than or equal to 1 and is less than or equal to M; M is a quantity of antennas of the transmit antennas; $y_n^k(l)$ is a received signal of the $n^{th}$ antenna of the receive antennas on the $k^{th}$ pilot subcarrier when the $l^{th}$ OFDM data symbol is received; $s_m^k(l)$ is a sent signal of the $m^{th}$ antenna of the transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the receive antennas and the $m^{th}$ antenna of the transmit antennas; and $(r_n^k(l))^*$ refers to an adjoint matrix of the matrix $r_n^k(l)$, where the matrix $r_n^k(l)$ is a system parameter of the $n^{th}$ antenna of the receive antennas on the $k^{th}$ pilot subcarrier when the $l^{th}$ OFDM data symbol is received; $r_n^k(l)$ is obtained through calculation, and a calculation formula of $r_n^k(l)$ is $$r_n^k(l) = \sum_{m=1}^{M} H_{nm}^k e^{j\theta_m^k(l-1)} s_m^k(l),$$

where $s_m^k(l)$ is the sent signal of the $m^{th}$ antenna of the transmit antennas on the $k^{th}$ pilot subcarrier when the $l^{th}$ OFDM data symbol is sent, $\theta_m^k(l-1)$ is a phase of the $m^{th}$ antenna of the transmit antennas when the $l-1^{th}$ OFDM data symbol is sent, and $H_{nm}^k$ is the channel over which the $k^{th}$ pilot subcarrier is sent between the $n^{th}$ antenna of the receive antennas and the $m^{th}$ antenna of the transmit antennas.

Specifically, the second set that includes the phases of each of the receive antennas when all the OFDM data symbols within the preset time period are received is acquired according to the received signals on the pilot subcarrier in each OFDM data symbol when all the OFDM data symbols within the preset time period are received.

Assuming that within the preset time period, the transmit antennas send a total of q OFDM data symbols and the receive antennas receive a total of q OFDM data symbols, when the $l^{th}$ OFDM data symbol of the q OFDM data symbols is sent, a phase $\varphi_n(l)$ of the $n^{th}$ antenna of the receive antennas satisfies:

$$\varphi_n(l) = \varphi_n(l-1) - \alpha \text{Im}\left[\sum_{k \in P} (y_n^k(l) e^{-j\varphi_n(l-1)} (r_n^k(l))^*)\right],$$

where α is an empirical value and may be set to different values such as $10^{-6}$ or $10^{-4}$ according to different systems; Im is a mathematical symbol and indicates that an imaginary part of a value in brackets behind Im is used; P is a pilot subcarrier set, that is, when a summation operation is performed, the operation is performed only for a pilot subcarrier; e is a natural constant, a value of e is about 2.71828, $e^{-j\varphi_n(l-1)}$ in the formula is a complex number expression manner, and a specific meaning of $e^{-j\varphi_n(l-1)}$ is $e^{-j\varphi_n(l-1)} = \cos[\varphi_n(l-1)] - j\sin[\varphi_n(l-1)]$, where j is an imaginary unit; n is an integer that is greater than or equal to 1 and is less than or equal to N; N is a quantity of the receive antennas; m is an integer that is greater than or equal to 1 and is less than or equal to M; M is a quantity of antennas of the transmit antennas; $y_n^k(l)$ is a received signal of the $n^{th}$ antenna of the receive antennas on the $k^{th}$ pilot subcarrier when the $l^{th}$ OFDM data symbol is received; $s_m^k(l)$ is a sent signal of the $m^{th}$ antenna of the transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the receive antennas and the $m^{th}$ antenna of the transmit antennas; and $(r_n^k(l))^*$ refers to an adjoint matrix of the matrix $r_n^k(l)$, where the matrix $r_n^k(l)$ is a system parameter of the $n^{th}$ antenna of the receive antennas on the $k^{th}$ pilot subcarrier when the $l^{th}$ OFDM data symbol is received; $r_n^k(l)$ is obtained through calculation, and a calculation formula of is $r_n^k(l)$ is $$r_n^k(l) = \sum_{m=1}^{M} H_{nm} e^{j\theta_m^k(l-1)} s_m^k(l),$$

where $s_m^k(l)$ is the sent signal of the $m^{th}$ antenna of the transmit antennas on the $k^{th}$ pilot subcarrier when the $l^{th}$ OFDM data symbol is sent, $\theta_m^k(l-1)$ is a phase of the mth antenna of the transmit antennas when the $l-1^{th}$ OFDM data symbol is sent, and $H_{nm}^k$ is the channel over which the $k^{th}$ pilot subcarrier is sent between the $n^{th}$ antenna of the receive antennas and the $m^{th}$ antenna of the transmit antennas.

It should be noted that this embodiment of the present disclosure is described by using an example of a system in which transmit antennas do not share a common oscillator and receive antennas do not share a common oscillator; in an actual application, the signal processing method may also be applied to a system in which transmit antennas share a common oscillator and receive antennas share a common oscillator, which is not described in detail in the present disclosure.

The phase noise compensation method in the present disclosure is usually applied to a high-speed backhaul network, a high-speed point-to-point network, a Wireless Fidelity technology, Worldwide Interoperability for Microwave Access, or Long Term Evolution.

According to the signal processing method provided in this embodiment of the present disclosure, phase noise compensation is performed on received signals of the receive antennas within a preset time period by using a phase of each of the transmit antennas and the receive antennas within the preset time period, to obtain compensated signals. Compared with the prior art, the present disclosure improves precision of phase noise compensation, and effectively reduces cases of signal distortion.

For example, for a 2*2 MIMO-OFDM system, a quantity M of antennas of the transmit antennas is 2, and a quantity N of antennas of the receive antennas is 2. It is assumed that the second and seventh subcarriers of each of the transmit antennas are pilot subcarriers used for phase updating, and sent signals on the second and seventh subcarriers are known in a receiving apparatus. It is assumed that $s_1^2=1$, $s_1^7=-1$, $s_2^2=1$, and $s_2^7=-1$, that is, a pilot subcarrier set P={2, 7}, and it is assumed that $\varphi_n(0)=0$ and $\theta_m(0)=0$. Because a quantity of subcarriers in one OFDM data symbol may be set according to a structure of a specific communications system, in this embodiment, it is assumed that the quantity of subcarriers in one OFDM data symbol is w and a total quantity of OFDM data symbols received by the receiving apparatus is q.

Specifically, received signals $y_1^2(1)$, $y_1^7(1)$, $y_2^2(1)$ and $y_2^7(1)$ that are on the pilot subcarriers and received by the receive antennas when the first OFDM data symbol is received are first acquired. Then, $s_1^2$, $s_1^7$, $s_2^2$, $s_2^7$, $y_1^2(1)$, $y_1^7(1)$, $y_2^2(1)$, $y_2^7(1)$, $\theta_m(0)$, and $\varphi_n(0)$ are substituted into the transmit phase calculation formula:

$$\theta_m(l) = \theta_m(l-1) - \alpha \text{Im}\left[\sum_{k \in P}\left(e^{-j\theta_m(l-1)}(s_m^k(l))^* \sum_{n=1}^{N}(H_{nm}^k)^*(y_n^k(l)e^{-j\varphi_n^k(l-1)} - r_n^k(l))\right)\right];$$

and after calculation, $\theta_1(1)$ and $\theta_2(1)$ can be obtained, where α is an empirical value and may be set to different values according to different systems.

Further, $s_1^2$, $s_1^7$, $s_2^2$, $s_2^7$, $y_1^2(1)$, $y_1^7(1)$, $y_2^2(1)$, $y_2^7(1)$, and $\varphi_n(0)$ are substituted into the receive phase calculation formula:

$$\varphi_n(l) = \varphi_n(l-1) - \alpha \text{Im}\left[\sum_{k \in P}(y_n^k(l)e^{-j\varphi_n(l-1)}(r_n^k(l))^*)\right];$$

and after calculation, $\varphi_1(1)$ and $\varphi_2(1)$ can be obtained, where α is an empirical value and may be set to different values according to different systems.

After $\varphi_1(1)$, $\varphi_2(1)$, $\theta_1(1)$, and $\theta_2(1)$ are obtained, a matrix $Y^1(1)$ that includes a received signal of each of the receive antennas on the first subcarrier when the first OFDM data symbol is received is acquired, where $$Y^1(1) = \begin{bmatrix} y_1^1(1) \\ y_2^1(1) \end{bmatrix};$$

a matrix $\Phi(1)$ that includes a phase of each of the receive antennas when the first OFDM data symbol is received is acquired, where $$\Phi(1) = \begin{pmatrix} e^{j\varphi_1(1)} & 0 \\ 0 & e^{j\varphi_2(1)} \end{pmatrix};$$

a matrix $\Theta(1)$ that includes a phase of each of the transmit antennas when the first OFDM data symbol is sent is acquired, where $$\Theta(1) = \begin{pmatrix} e^{j\theta_1(1)} & 0 \\ 0 & e^{j\theta_2(1)} \end{pmatrix};$$

$H^1$ is a channel between the receive and transmit antennas for the first subcarrier when the first OFDM data symbol is received; and $\Theta(1)$, $\Phi(1)$, $Y^1(1)$, and $H^1$ are substituted into a compensation formula $Y^r(l)=\Phi(l)\cdot H^r\cdot\Theta(l)\cdot X^r(l)+ICI_l+z_l$. In this way, a matrix $X^1(1)$ that includes compensated signals of the receive antennas on the first subcarrier when the first OFDM data symbol is received can be obtained through calculation. Similarly, compensated signals of the receive antennas on the second to $w^{th}$ subcarriers when the first OFDM data symbol is received can be sequentially obtained through calculation.

Then, the foregoing process is repeated, and compensated signals of the receive antennas on each subcarrier when the second to $q^{th}$ OFDM data symbols are received can be obtained through calculation. Finally, compensated signals on each subcarrier when each OFDM data symbol is received are obtained, and the obtained compensated signals are compensated signals finally obtained by the receiving apparatus.

For example, for a 2*3 MIMO-OFDM system, a quantity M of antennas of the transmit antennas is 2, and a quantity N of antennas of the receive antennas is 3. It is assumed that the second and seventh subcarriers are pilot subcarriers used for phase updating, and sent signals on the second and seventh subcarriers are known in a receiving apparatus. It is assumed that $s_1^2=1$, $s_1^7=-1$, $s_2^2=1$, and $s_2^7=-1$, that is, a pilot subcarrier set $P=\{2, 7\}$, and it is assumed that $\varphi_n(0)=0$ and $\theta_m(0)=0$. Because a quantity of subcarriers in one OFDM data symbol may be set according to a structure of a specific communications system, in this embodiment, it is assumed that the quantity of subcarriers in one OFDM data symbol is w and a total quantity of OFDM data symbols received by the receiving apparatus is q.

Specifically, received signals $y_1^2(1)$, $y_1^7(1)$, $y_2^2(1)$, $y_2^7(1)$, $y_3^2(1)$, and $y_3^7(1)$ on the pilot subcarriers received by the receive antennas when the first OFDM data symbol is received are first acquired, and then $s_1^2$, $s_1^7$, $s_2^2$, $s_2^7$, $y_1^2(1)$, $y_1^7(1)$, $y_2^2(1)$, $y_2^7(1)$, $y_3^2(1)$, $y_3^7(1)$, $\theta_m(0)$, and $\varphi_n(0)$ are substituted into the transmit phase calculation formula:

$$\theta_m(l) = \theta_m(l-1) - \alpha \mathrm{Im}\left[\sum_{k\in P}\left(e^{-j\theta_m(l-1)}(s_m^k(l))^* \sum_{n=1}^{N}(H_{nm}^k)^*(y_n^k(l)e^{-j\varphi_n(l-1)} - r_n^k(l))\right)\right];$$

and after calculation, $\theta_1(1)$ and $\theta_2(1)$ can be obtained, where $\alpha$ is an empirical value and may be set to different values according to different systems.

Further, $s_1^2$, $s_1^7$, $s_2^2$, $s_2^7$, $y_1^2(1)$, $y_1^7(1)$, $y_2^2(1)$, $y_2^7(1)$, $y_2^3(1)$, $y_3^7(1)$, and $\varphi_n(0)$ are substituted into the receive phase calculation formula:

$$\varphi_n(l) = \varphi_n(l-1) - \alpha\mathrm{Im}\left[\sum_{k\in P}(y_n^k(l)e^{-j\varphi_n(l-1)}(r_n^k(l))^*\right];$$

and after calculation, $\varphi_1(1)$, $\varphi_2(1)$, and $\varphi_3(1)$ can be obtained, where $\alpha$ is an empirical value and may be set to different values according to different systems.

After $\varphi_1(1)$, $\varphi_2(1)$, $\varphi_3(1)$, $\theta_1(1)$, and $\theta_2(1)$ are obtained, a matrix $Y^1(1)$ that includes a received signal of each of the receive antennas on the first subcarrier when the first OFDM data symbol is received is acquired, where $$Y^1(1) = \begin{bmatrix} y_1^1(1) \\ y_2^1(1) \\ y_3^1(1) \end{bmatrix};$$

a matrix $\Phi(1)$ that includes a phase of each of the receive antennas when the first OFDM data symbol is received is acquired, where $$\Phi(1) = \begin{bmatrix} e^{j\varphi_1(1)} & 0 & 0 \\ 0 & e^{j\varphi_2(1)} & 0 \\ 0 & 0 & e^{j\varphi_3(1)} \end{bmatrix};$$

a matrix $\Theta(1)$ that includes a phase of each of the transmit antennas when the first OFDM data symbol is sent is acquired, where $$\Theta(1) = \begin{pmatrix} e^{j\theta_1(1)} & 0 \\ 0 & e^{j\theta_2(1)} \end{pmatrix};$$

$H^1$ is a channel between the receive and transmit antennas for the first subcarrier when the first OFDM data symbol is received; and $\Theta(1)$, $\Phi(1)$, $Y^1(1)$, and $H^1$ are substituted into a compensation formula $Y^r(l)=\Phi(l)\cdot H^r\cdot\Theta(l)\cdot X^r(l)+ICI_l+z_l$. In this way, a matrix $X^1(1)$ that includes compensated signals of the receive antennas on the first subcarrier when the first OFDM data symbol is received can be obtained through calculation. Similarly, compensated signals of the receive antennas on the second to $w^{th}$ subcarriers when the first OFDM data symbol is received can be sequentially obtained through calculation.

Then, the foregoing process is repeated, and compensated signals of the receive antennas on each subcarrier when the second to $q^{th}$ OFDM data symbols are received can be obtained through calculation. Finally, compensated signals on each subcarrier when each OFDM data symbol is received are obtained, and the obtained compensated signal are compensated signals finally obtained by the receiving apparatus.

Figure 3:
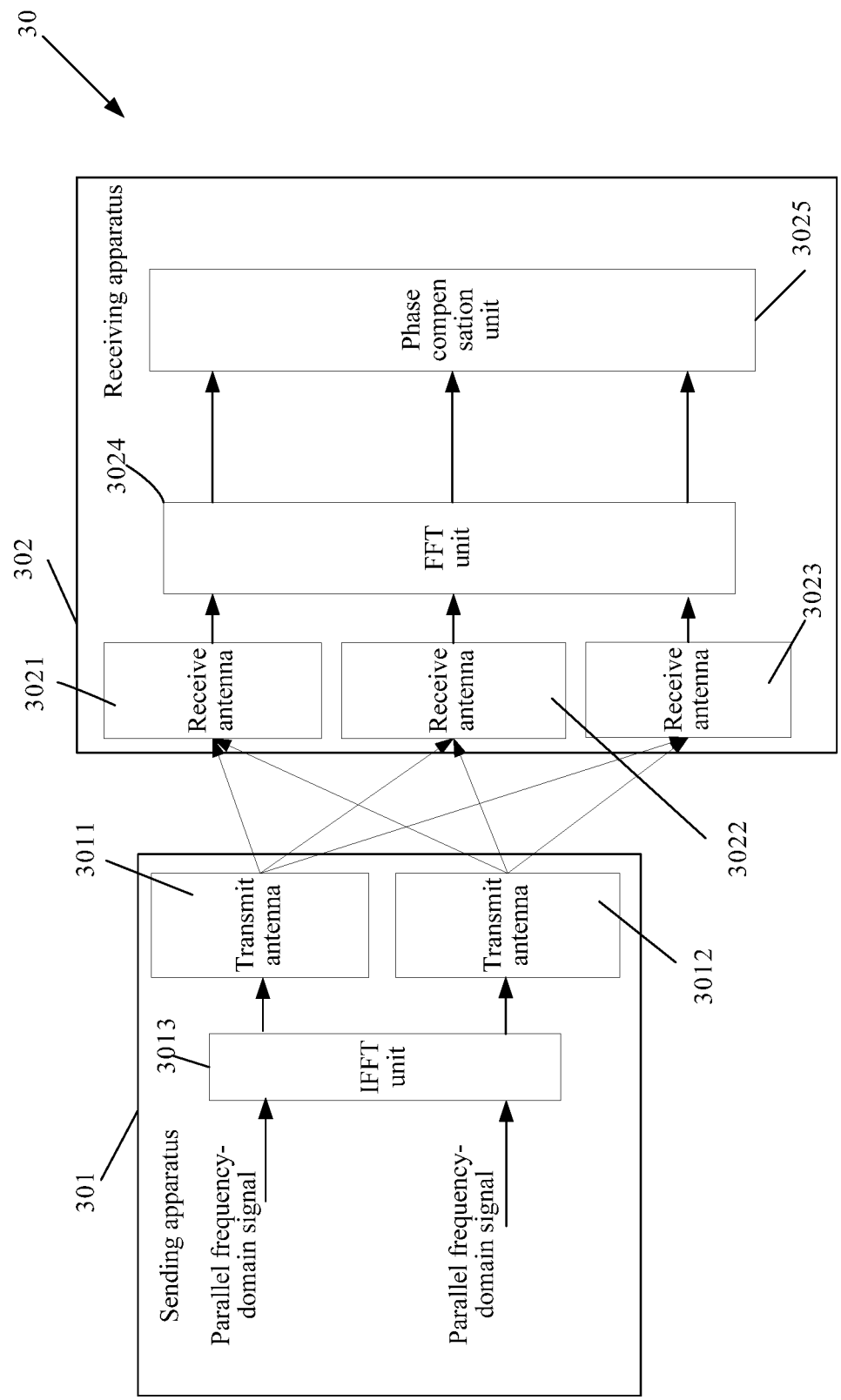
FIG. 3 is a system diagram of a signal processing method according to an embodiment of the present disclosure.

For example, as shown in FIG. 3, a 2*3 MIMO-OFDM system 30 includes a sending apparatus 301 and a receiving apparatus 302. Two transmit antennas, which are a transmit antenna 3011 and a transmit antenna 3012, are disposed on the sending apparatus 301, that is, an antenna quantity M of transmit antennas disposed on the sending apparatus 301 is two; and an IFFT unit 3013 is further disposed on the sending apparatus 301. Three receive antennas, which are a receive antenna 3021, a receive antenna 3022, and a receive antenna 3023, are disposed on the receiving apparatus 302, that is, an antenna quantity N of receive antennas disposed on the receiving apparatus 302 is 3; and an FFT unit 3024 and a phase compensation unit 3025 are further disposed on the receiving apparatus.

It is assumed that when sending the first OFDM symbol, the sending apparatus 301 in the MIMO-OFDM system first acquires a frequency-domain signal that needs to be sent, and then the sending apparatus 301 performs serial-to-parallel conversion on the acquired frequency-domain signal, to convert the acquired serial frequency-domain signal into multiple parallel frequency-domain signals. In this embodiment, it is assumed that a quantity of subcarriers in one OFDM data symbol is w=8, that is, one serial signal is converted into eight parallel signals that are sent simultaneously, the second and seventh subcarriers are pilot subcarriers used for phase updating, and sent signals on the second and seventh subcarriers are known in the receiving apparatus 302. It is assumed that $s_1^2=1$, $s_1^7=-1$, $s_2^2=1$, and $s_2^7=-1$, and it is assumed that frequency-domain sent signals of the first OFDM symbol are:

$$S_1^1(1)=1, S_1^2(1)=1, S_1^3(1)=-1, S_1^4(1)=1, S_1^5(1)=1, S_1^6(1)=-1, S_1^7(1)=-1, S_1^8(1)=1 \text{ and}$$

$$S_2^1(1)=-1, S_2^2(1)=1, S_2^3(1)=-1, S_2^4(1)=1, S_2^5(1)=1, S_2^6(1)=-1, S_2^7(1)=-1, S_2^8(1)=-1.$$

Then, the IFFT unit 3013 performs IFFT (Inverse Fast Fourier Transform, inverse fast Fourier transformation) on the parallel frequency-domain sent signals, where a formula for the IFFT is $$s_m(t) = \sum_{k=1}^{8} S_m^k(l) e^{j\frac{2\pi}{8}tk},$$

where $s_m(t)$ is a signal on the $t^{th}$ subcarrier of the $m^{th}$ antenna when the $l^{th}$ OFDM symbol is sent. After the IFFT, it is obtained that time-domain signals sent on eight subcarriers of the first antenna are $s_1(1)$, $s_1(2)$, $s_1(3)$, $s_1(4)$, $s_1(5)$, $s_1(6)$, $s_1(7)$, and $s_1(8)$, and time-domain signals sent on eight subcarriers of the second antenna are $s_2(1)$, $s_2(2)$, $s_2(3)$, $s_2(4)$, $s_2(5)$, $s_2(6)$, $s_2(7)$, and $s_2(8)$. Then, the obtained time-domain signals are sent by using the transmit antenna 3011 and the transmit antenna 3012.

After the sending apparatus 301 sends the time-domain signals, the receiving apparatus 302 in the MIMO-OFDM system receives, by using the receive antennas, the time-domain signals sent by the sending apparatus 301. Time-domain signals that are sent by the transmit antenna 3011 and received by the receive antenna 3021 are $y_{11}(1)$, $y_{11}(2)$, $y_{11}(3)$, $y_{11}(4)$, $y_{11}(5)$, $y_{11}(6)$, $y_{11}(7)$, and $y_{11}(8)$; time-domain signals that are sent by the transmit antenna 3012 and received by the receive antenna 3021 are $y_{12}(1)$, $y_{12}(2)$, $y_{12}(3)$, $y_{12}(4)$, $y_{12}(5)$, $y_{12}(6)$, $y_{12}(7)$, and $y_{12}(8)$; time-domain signals that are sent by the transmit antenna 3011 and received by the receive antenna 3022 are $y_{21}(1)$, $y_{21}(2)$, $y_{21}(3)$, $y_{21}(4)$, $y_{21}(5)$, $y_{21}(6)$, $y_{21}(7)$, and $y_{21}(8)$; time-domain signals that are sent by the transmit antenna 3012 and received by the receive antenna 3022 are $y_{22}(1)$, $y_{22}(2)$, $y_{22}(3)$, $y_{22}(4)$, $y_{22}(5)$, $y_{22}(6)$, $y_{22}(7)$, and $y_{22}(8)$; time-domain signals that are sent by the transmit antenna 3011 and received by the receive antenna 3023 are $y_{31}(1)$, $y_{31}(2)$, $y_{31}(3)$, $y_{31}(4)$, $y_{31}(5)$, $y_{31}(6)$, $y_{31}(7)$, and $y_{31}(8)$; and time-domain signals that are sent by the transmit antenna 3012 and received by the receive antenna 3023 are $y_{32}(1)$, $y_{32}(2)$, $y_{32}(3)$, $y_{32}(4)$, $y_{32}(5)$, $y_{32}(6)$, $y_{32}(7)$, and $y_{32}(8)$. Then, the FFT unit 3024 performs FFT (Fast Fourier Transformation, fast Fourier transformation) on the received time-domain signals, that is, converts the time-domain signals into frequency domain signals, to obtain a frequency-domain signal $y_n^k(1)$ that is obtained by the receiving apparatus 302 when the first OFDM data symbol is received, where $y_n^k(1)$ is a signal that is on the $k^{th}$ subcarrier and received by the $n^{th}$ receive antenna when the first OFDM data symbol is received, and $y_n^k(1)$ includes signals on the $k^{th}$ subcarriers of all the transmit antennas, where k is an integer that is greater than 0 and is less than or equal to eight. That is, frequency-domain signals received by the receive antenna 3021 are $y_1^1(1)$, $y_1^2(1)$, $y_1^3(1)$, $y_1^4(1)$, $y_1^5(1)$, $y_1^6(1)$, $y_1^7(1)$, and $y_1^8(1)$; frequency-domain signals received by the receive antenna 3022 are $y_2^1(1)$, $y_2^2(1)$, $y_2^3(1)$, $y_2^4(1)$, $y_2^5(1)$, $y_2^6(1)$, $y_2^7(1)$, and $y_2^8(1)$; and frequency-domain signals received by the receive antenna 3023 are $y_3^1(1)$, $y_3^2(1)$, $y_3^3(1)$, $y_3^4(1)$, $y_3^5(1)$, $y_3^6(1)$, $y_3^7(1)$, and $y_3^8(1)$. Then, phase compensation is performed on the obtained $y_n^k(1)$. Because pilot subcarriers in this embodiment are the second and seventh subcarriers, received signals on the pilot subcarrier are $y_1^2(1)$, $y_1^7(1)$, $y_2^2(1)$, $y_2^7(1)$, $y_3^2(1)$, and $y_3^7(1)$. $s_1^2$, $s_1^7$, $s_2^2$, $s_2^7$, $y_1^2(1)$, $y_1^7(1)$, $y_2^2(1)$, $y_2^7(1)$, $y_3^2(1)$, $y_3^7(1)$, and $\theta_m(0)$ are substituted into the phase compensation unit 3025 for calculation, to complete phase compensation for the received signals.

Specifically, $s_1^2$, $s_1^7$, $s_2^2$, $s_2^7$, $y_1^2(1)$, $y_1^7(1)$, $y_2^2(1)$, $y_2^7(1)$, $y_3^2(1)$, $y_3^7(1)$, and $\theta_m(0)$, and $\varphi_n(0)$ are substituted into a transmit phase calculation formula:

$$\theta_m(l) = \theta_m(l-1) - \alpha \text{Im}\left[\sum_{k \in P}\left(e^{-j\theta_m(l-1)}\left(s_m^k(l)^* \sum_{n=1}^{N}(H_{nm}^k)^*(y_n^k(l)e^{-j\varphi_n^k(l-1)} - r_n^k(l))\right)\right)\right];$$

and after calculation, $\theta_1(1)$ and $\theta_2(1)$ can be obtained, where $\alpha$ is an empirical value and may be set to different values according to different systems.

Further, $s_1^2$, $s_1^7$, $s_2^2$, $s_2^7$, $y_1^2(1)$, $y_1^7(1)$, $y_2^2(1)$, $y_2^7(1)$, $y_3^2(1)$, $y_3^7(1)$, and $\varphi_n(0)$ are substituted into a receive phase calculation formula:

$$\varphi_n(l) = \varphi_n(l-1) - \alpha \text{Im}\left[\sum_{k \in P}(y_n^k(l)e^{-j\varphi_n(l-1)}(r_n^k(l))^*)\right];$$

and after calculation, $\varphi_1(1)$, $\varphi_2(1)$, and $\varphi_3(1)$ can be obtained, where $\alpha$ is an empirical value and may be set to different values according to different systems.

After obtaining $\varphi_1(1)$, $\varphi_2(1)$, $\varphi_3(1)$, $\theta_1(1)$, and $\theta_2(1)$, the receiving apparatus 302 acquires a matrix $Y^1(1)$ that includes a received signal of each of the receive antennas on the first subcarrier when the first OFDM data symbol is received, where $$Y^1(1) = \begin{bmatrix} y_1^1(1) \\ y_2^1(1) \\ y_3^1(1) \end{bmatrix};$$

acquires a matrix $\Phi(1)$ that includes a phase of each of the receive antennas when the first OFDM data symbol is received, where $$\Phi(1) = \begin{bmatrix} e^{j\varphi_1(1)} & 0 & 0 \\ 0 & e^{j\varphi_2(1)} & 0 \\ 0 & 0 & e^{j\varphi_3(1)} \end{bmatrix};$$

acquires a matrix $\Theta(1)$ that includes a phase of each of the transmit antennas when the first OFDM data symbol is sent, where $$\Theta(1) = \begin{pmatrix} e^{j\theta_1(1)} & 0 \\ 0 & e^{j\theta_2(1)} \end{pmatrix}.$$

$H^1$ is a channel between the receive and transmit antennas for the first subcarrier when the first OFDM data symbol is received; and $\Theta(1)$, $\Phi(1)$, $Y^1(1)$, $H^1$ are substituted into a compensation formula $Y^t(1)=\Phi(1) \cdot H^t \cdot \Theta(1) \cdot X^t(1)+ICI_l+z_l$. In this way, a matrix $X^1(1)$ that includes compensated signals of the receive antennas on the first subcarrier when the first OFDM data symbol is received can be obtained through calculation. Similarly, compensated signals of the receive antennas on the second to $w^{th}$ subcarriers when the first OFDM data symbol is received can be sequentially obtained through calculation.

After all compensated signals of the first OFDM data symbol are obtained, parallel-to-serial conversion is performed on the obtained compensated signals; in this way, the received signals can be restored to original user data.

Then, the foregoing process is repeated, and compensated signals of the receive antennas on each subcarrier when the second to $q^{th}$ OFDM data symbols are received can be obtained through calculation. Finally, compensated signals on each subcarrier when each OFDM data symbol is received are obtained, and the obtained compensated signals are compensated signals finally obtained by the receiving apparatus 302.

A signal processing method provided in this embodiment of the present disclosure is applied to a MIMO-OFDM system in which receive antennas or transmit antennas do not share a common oscillator, where phase noise compensation is performed on received signals of the receive antennas by using a phase of each of the transmit antennas and the receive antennas, to obtain compensated signals. Compared with the prior art, the present disclosure improves precision of phase noise compensation, and effectively reduces cases of signal distortion.

Figure 4:
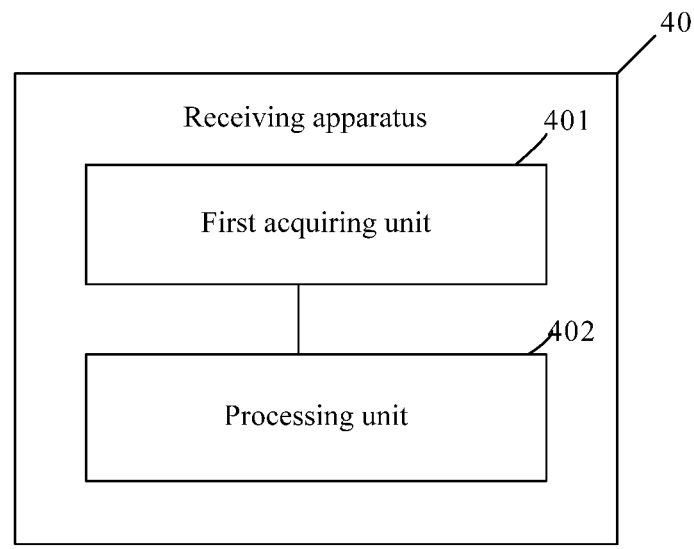
FIG. 4 is a schematic structural diagram of a receiving apparatus according to an embodiment of the present disclosure.

As shown in FIG. 4, an embodiment of the present disclosure provides a receiving apparatus 40, including:

a first acquiring unit 401, configured to acquire a phase of each of transmit antennas when the $l^{th}$ OFDM data symbol is sent, where the first acquiring unit 401 is further configured to acquire a phase of each of receive antennas when the $l^{th}$ OFDM data symbol is received; and a processing unit 402, configured to compensate received signals of each of the receive antennas according to the phase of each of the transmit antennas when the $l^{th}$ OFDM data symbol is sent and the phase of each of the receive antennas when the $l^{th}$ OFDM data symbol is received, to obtain compensated signals of each receive antenna.

A compensation formula is:

$Y^t(l)=\Phi(l)\cdot H^t\cdot\Theta(l)\cdot X^t(l)+ICI_l+z_l,$ where $Y^t(l)$ is a matrix that includes a received signal of each of the receive antennas on the $t^{th}$ subcarrier when the $l^{th}$ OFDM data symbol is received, where specifically, $$Y^t(l) = \begin{bmatrix} y_1^t(l) \\ M \\ y_N^t(l) \end{bmatrix},$$

and $y_1^t(l)$ to $y_N^t(l)$ respectively represent received signals of the first to $N^{th}$ antennas of the receive antennas on the $t^{th}$ subcarrier when the $l^{th}$ OFDM data symbol is received; $\Phi(l)$ is a matrix that includes a phase of each of the receive antennas when the $l^{th}$ OFDM data symbol is received, where specifically, $$\Phi(l) = \begin{bmatrix} e^{j\varphi_1(l)} & \cdots & 0 \\ \vdots & \ddots & \vdots \\ 0 & \cdots & e^{j\varphi_N(l)} \end{bmatrix},$$

and $\varphi_1(l)$ to $\varphi_N(l)$ respectively represent phases of the first to Nth antennas of the receive antennas when the $l^{th}$ OFDM data symbol is received; $H^t$ is a channel between the receive and transmit antennas for the $t^{th}$ subcarrier when the $l^{th}$ OFDM data symbol is received; $\Theta(l)$ is a matrix that includes a phase of each of the transmit antennas when the $l^{th}$ OFDM data symbol is sent, where specifically, $$\Theta(l) = \begin{bmatrix} e^{j\theta_1(l)} & \cdots & 0 \\ \vdots & \ddots & \vdots \\ 0 & \cdots & e^{j\theta_M(l)} \end{bmatrix},$$

and $\theta_1(l)$ to $\theta_M(l)$ respectively represent phases of the first to Nth antennas of the transmit antennas when the $l^{th}$ OFDM data symbol is sent; $X^t(l)$ is compensated signals on the $t^{th}$ subcarrier when the $l^{th}$ OFDM data symbol is received, where specifically, $$X^t(l) = \begin{bmatrix} x_1^t(l) \\ \vdots \\ x_M^t(l) \end{bmatrix},$$

and $x_1^t(l)$ to $x_M^t(l)$ respectively represent compensated signals of the first to $M^{th}$ antennas on the $t^{th}$ subcarrier when the $l^{th}$ OFDM data symbol is received; $ICI_l$ is an inter-carrier interference matrix, where in an actual application, the inter-carrier interference matrix may include main inter-carrier interference and residual inter-carrier interference; and $z_l$ is a noise matrix.

Figure 5:
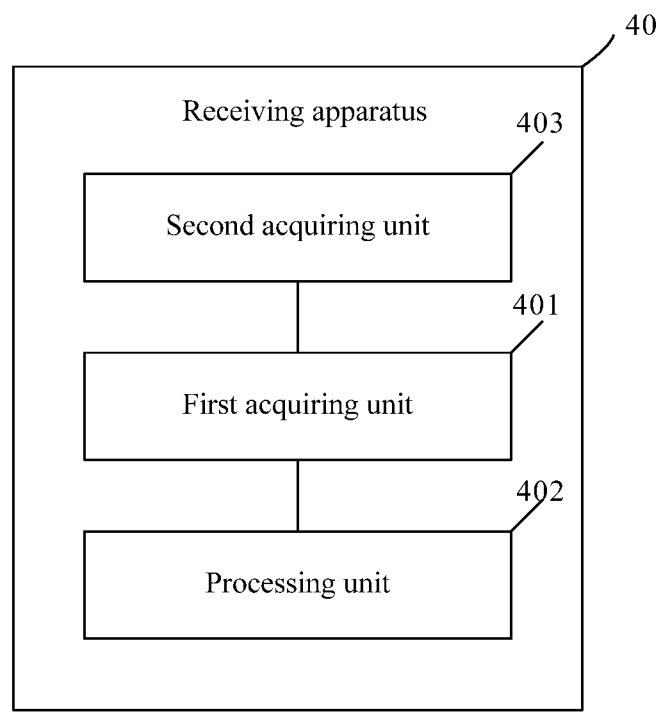
FIG. 5 is a schematic structural diagram of another receiving apparatus according to an embodiment of the present disclosure.

As shown in FIG. 5, the receiving apparatus 40 further includes:

a second acquiring unit 403, configured to acquire sent signals on a pilot subcarrier when the $l^{th}$ OFDM data symbol is sent;

the second acquiring unit 403 is further configured to acquire received signals on the pilot subcarrier when the $l^{th}$ OFDM data symbol is received.

The first acquiring unit 401 is specifically configured to:
calculate, according to the sent signals on the pilot subcarrier and the received signals on the pilot subcarrier and by using a transmit phase calculation formula, the phase of each of the transmit antennas when the $l^{th}$ OFDM data symbol is sent, where
the transmit phase calculation formula is:

$$\theta_m(l) = \theta_m(l-1) - \alpha \operatorname{Im}\left[\sum_{k \in P}\left(e^{-j\theta_m(l-1)}\left(s_m^k(l)^* \sum_{n=1}^{N}(H_{nm}^k)^*\left(y_n^k(l)e^{-j\varphi_n(l-1)} - r_n^k(l)\right)\right)\right)\right],$$

where $\theta_m(l)$ is a phase of the $m^{th}$ antenna of the transmit antennas when the $l^{th}$ OFDM data symbol is sent, where an initial value $\theta_m(0)$ is a value preset by a system and is usually set to 0; $\varphi_n(l-1)$ is a phase of the $n^{th}$ antenna of the receive antennas when the $(l-1)^{th}$ OFDM data symbol is received, where for the transmit antennas when the $l^{th}$ OFDM data symbol is received, $\varphi_n(l-1)$ is known and can be calculated by using a receive phase calculation formula when the $(l-1)^{th}$ OFDM data symbol is received, and an initial value $\varphi_n(0)$ is a value preset by the system and is usually set to 0; $\alpha$ is an empirical value and may be set to different values such as $10^{-6}$ or $10^{-4}$ according to different systems; Im is a mathematical symbol and indicates that an imaginary part of a value in brackets behind Im is used; P is a pilot subcarrier set, that is, when a summation operation is performed, the operation is performed only for a pilot subcarrier; e is a natural constant, a value of e is about 2.71828, $e^{-j\varphi_n(l-1)}$ in the formula is a complex number expression manner, and a specific meaning of $e^{-j\varphi_n(l-1)}$ is $e^{-j\varphi_n(l-1)} = \cos[\varphi_n(l-1)] - j\sin[\varphi_n(l-1)]$, where j is an imaginary unit; n is an integer that is greater than or equal to 1 and is less than or equal to N; N is a quantity of the receive antennas; m is an integer that is greater than or equal to 1 and is less than or equal to M; M is a quantity of antennas of the transmit antennas; $y_n^k(l)$ is a received signal of the $n^{th}$ antenna of the receive antennas on the $k^{th}$ pilot subcarrier when the $l^{di}$ OFDM data symbol is received; $s_m^k(l)$ is a sent signal of the mth antenna of the transmit antennas on the $k^{th}$ pilot subcarrier when the $l^{th}$ OFDM data symbol is sent; $H_{nm}^k$ is a channel over which the $k^{th}$ pilot subcarrier is sent between the nth antenna of the receive antennas and the $m^{th}$ antenna of the transmit antennas; and $(r_n^k(l))^*$ refers to an adjoint matrix of the matrix $r_n^k(l)$, where the matrix $r_n^k(l)$ is a system parameter of the $n^{th}$ antenna of the receive antennas on the $k^{th}$ pilot subcarrier when the $l^{th}$ OFDM data symbol is received; $r_n^k(l)$ is obtained through calculation, and a calculation formula of $r_n^k(l)$ is $$r_n^k(l) = \sum_{m=1}^{M} H_{nm}^k e^{j\theta_m^k(l-1)} s_m^k(l),$$

where $s_m^k(l)$ is the sent signal of the $m^{th}$ antenna of the transmit antennas on the $k^{th}$ pilot subcarrier when the $l^{th}$ OFDM data symbol is sent, $\theta_m^k(l-1)$ is a phase of the $m^{th}$ antenna of the transmit antennas when the $l-1^{th}$ OFDM data symbol is sent, and $H_{nm}^k$ is the channel over which the $k^{th}$ pilot subcarrier is sent between the $n^{th}$ antenna of the receive antennas and the $m^{th}$ antenna of the transmit antennas.

The first acquiring unit 401 may be further configured to:
calculate, according to the sent signals on the pilot subcarrier and the received signals on the pilot subcarrier and by using a receive phase calculation formula, the phase of each of the receive antennas when the $l^{th}$ OFDM data symbol is received, where
the receive phase calculation formula is:

$$\varphi_n(l) = \varphi_n(l-1) - \alpha \operatorname{Im}\left[\sum_{k \in P}(y_n^k(l)e^{-j\varphi_n(l-1)}(r_n^k(l))^*)\right],$$

where $\varphi_n(l)$ is a phase of the $n^{th}$ antenna of the receive antennas when the $l^{th}$ OFDM data symbol is received, where an initial value $\varphi_n(0)$ is a value preset by a system and is usually set to 0; $\alpha$ is an empirical value and may be set to different values such as $10^{-6}$ or $10^{-4}$ according to different systems; Im is a mathematical symbol and indicates that an imaginary part of a value in brackets behind Im is used; P is a pilot subcarrier set, that is, when a summation operation is performed, the operation is performed only for a pilot subcarrier; e is a natural constant, a value of e is about 2.71828, $e^{-j\varphi_n(l-1)}$ in the formula is a complex number expression manner, and a specific meaning of $e^{-j\varphi_n(l-1)}$ is $e^{-j\varphi_n(l-1)} = \cos[\varphi_n(l-1)] - j\sin[\varphi_n(l-1)]$, where j is an imaginary unit; n is an integer that is greater than or equal to 1 and is less than or equal to N; N is a quantity of the receive antennas; m is an integer that is greater than or equal to 1 and is less than or equal to M; M is a quantity of antennas of the transmit antennas; $y_n^k(l)$ is a received signal of the $n^{th}$ antenna of the receive antennas on the $k^{th}$ pilot subcarrier when the $l^{th}$ OFDM data symbol is received; $s_m^k(l)$ is a sent signal of the $m^{th}$ antenna of the transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the receive antennas and the $m^{th}$ antenna of the transmit antennas; and $(r_n^k(l))^*$ refers to an adjoint matrix of the matrix $r_n^k(l)$, where the matrix $r_n^k(l)$ is a system parameter of the $n^{th}$ antenna of the receive antennas on the $k^{th}$ pilot subcarrier when the $l^{th}$ OFDM data symbol is received; $r_n^k(l)$ is obtained through calculation, and a calculation formula of $r_n^k(l)$ is $$r_n^k(l) = \sum_{m=1}^{M} H_{nm}^k e^{j\theta_m^k(l-1)} s_m^k(l),$$

where $s_m^k(l)$ is the sent signal of the $m^{th}$ antenna of the transmit antennas on the $k^{th}$ pilot subcarrier when the $l^{th}$ OFDM data symbol is sent, $\theta_m^k(l-1)$ is a phase of the $m^{th}$ antenna of the transmit antennas when the $l-1^{th}$ OFDM data symbol is sent, and $H_{nm}^k$ is the channel over which the $k^{th}$ pilot subcarrier is sent between the $n^{th}$ antenna of the receive antennas and the $m^{th}$ antenna of the transmit antennas.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The receiving apparatus provided in this embodiment of the present disclosure is used in a MIMO-OFDM system in which receive antennas or transmit antennas do not share a common oscillator, where the processing unit performs, by using a phase of each of the transmit antennas when an OFDM data symbol is sent and a phase of each of the receive antennas when the OFDM data symbol is received, phase noise compensation on received signals of the receive antennas when the OFDM data symbol is received, to obtain compensated signals. Compared with the prior art, the present disclosure improves precision of phase noise compensation, and effectively reduces cases of signal distortion.

An embodiment of the present disclosure provides a communications system, including:

the receiving apparatus according to any embodiment of the present disclosure, where receive antennas are disposed on the receiving apparatus, and the receiving apparatus is configured to: acquire a phase of each of transmit antennas when the $l^{th}$ OFDM data symbol is sent; acquire a phase of each of the receive antennas when the $l^{th}$ OFDM data symbol is received; and compensate received signals of each of the receive antennas by using a compensation formula and according to the phase of each of the transmit antennas when the $l^{th}$ OFDM data symbol is sent and the phase of each of the receive antennas when the $l^{th}$ OFDM data symbol is received that are acquired by a first acquiring unit, to obtain compensated signals of each receive antenna; and a sending apparatus, where transmit antennas are disposed on the sending apparatus, which are configured to send signals to the receiving apparatus.

It should be noted that the communications system provided in this embodiment of the present disclosure may be shown in FIG. 3, and for specific content, refer to the explanation of FIG. 3 in the foregoing embodiment.

Figure 6:
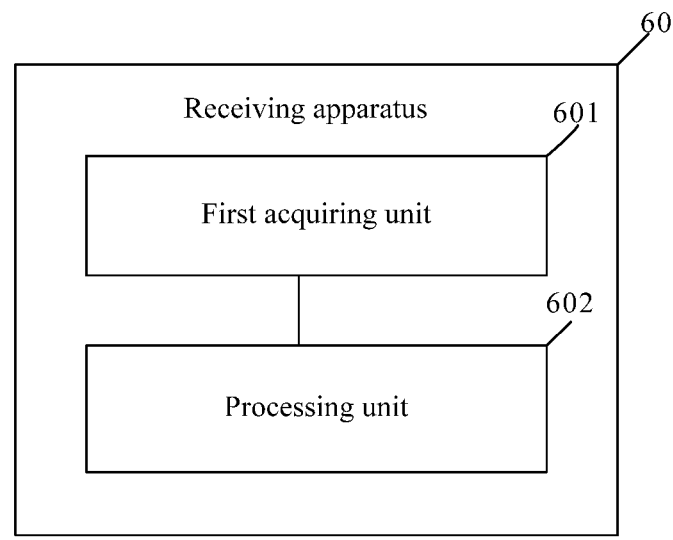
FIG. 6 is a schematic structural diagram of still another receiving apparatus according to an embodiment of the present disclosure.

As shown in FIG. 6, an embodiment of the present disclosure provides a receiving apparatus 60, including:

a first acquiring unit 601, configured to acquire a first set that includes phases of each of transmit antennas when all OFDM data symbols within a preset time period are sent, where the first acquiring unit 601 is further configured to acquire a second set that includes phases of each of receive antennas when all the OFDM data symbols within the preset time period are received; and a processing unit 602, configured to compensate received signals of each of the receive antennas according to the first set and the second set that are acquired by the first acquiring unit, to obtain compensated signals of each receive antenna.

If the preset time period includes q OFDM data symbols, where q is an integer greater than or equal to 1, when the $l^{th}$ OFDM data symbol of the q OFDM data symbols is received, compensated signals when the $l^{th}$ OFDM data symbol is received are obtained according to a compensation formula and by using a phase of each of the transmit antennas that is in the first set when the $l^{th}$ OFDM data symbol is sent, a phase of each of the receive antennas that is in the second set when the $l^{th}$ OFDM data symbol is received, and received signals when the $l^{th}$ OFDM data symbol within the preset time period is received, where the compensation formula is:

$Y^t(l) = \Phi(l) \cdot H^t \cdot \Theta(l) \cdot X^t(l) + ICI_l + z_l$, where $Y^t(l)$ is a matrix that includes a received signal of each of the receive antennas on the $t^{th}$ subcarrier when the $l^{th}$ OFDM data symbol is received, where specifically, $$Y^t(l) = \begin{bmatrix} y_1^t(l) \\ M \\ y_N^t(l) \end{bmatrix},$$

and $y_1^t(l)$ to $y_N^t(l)$ respectively represent received signals of the first to $N^{th}$ antennas of the receive antennas on the $t^{th}$ subcarrier when the $l^{th}$ OFDM data symbol is received; $\Phi(l)$ is a matrix that includes a phase of each of the receive antennas when the $l^{th}$ OFDM data symbol is received, where specifically, $$\Phi(l) = \begin{bmatrix} e^{j\varphi_1(l)} & \cdots & 0 \\ \vdots & \ddots & \vdots \\ 0 & \cdots & e^{j\varphi_N(l)} \end{bmatrix}$$

and $\varphi_1(l)$ to $\varphi_N(l)$ respectively represent phases of the first to Nth antennas of the receive antennas when the $l^{th}$ OFDM data symbol is received; $H^t$ is a channel between the receive and transmit antennas for the $t^{th}$ subcarrier when the $l^{th}$ OFDM data symbol is received; $\Theta(l)$ is a matrix that includes a phase of each of the transmit antennas when the $l^{th}$ OFDM data symbol is sent, where specifically, $$\Theta(l) = \begin{bmatrix} e^{j\theta_1(l)} & \cdots & 0 \\ \vdots & \ddots & \vdots \\ 0 & \cdots & e^{j\theta_M(l)} \end{bmatrix},$$

and $\theta_1(l)$ to $\theta_M(l)$ respectively represent phases of the first to Nth antennas of the transmit antennas when the $l^{th}$ OFDM data symbol is sent; $X^t(l)$ is compensated signals on the $t^{th}$ subcarrier when the $l^{th}$ OFDM data symbol is received, where specifically, $$X^t(l) = \begin{bmatrix} x_1^t(l) \\ \vdots \\ x_M^t(l) \end{bmatrix},$$

and $x_1^t(l)$ to $x_M^t(l)$ respectively represent compensated signals of the first to $M^{th}$ antennas on the $t^{th}$ subcarrier when the $l^{th}$ OFDM data symbol is received; $ICI_l$ is an inter-carrier interference matrix, where in an actual application, the inter-carrier interference matrix may include main inter-carrier interference and residual inter-carrier interference; and $z_l$ is a noise matrix.

Figure 7:
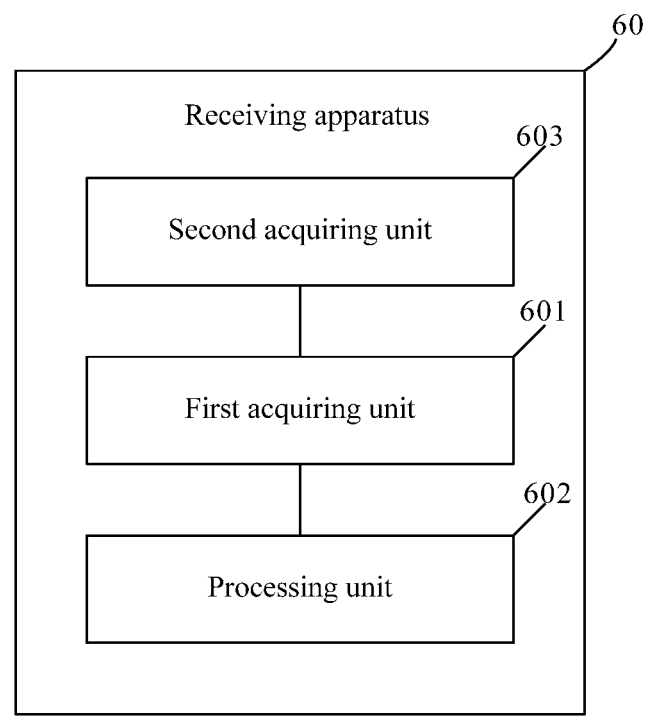
FIG. 7 is a schematic structural diagram of yet another receiving apparatus according to an embodiment of the present disclosure.

As shown in FIG. 7, the receiving apparatus 60 further includes:

a second acquiring unit 603, configured to acquire sent signals on a pilot subcarrier in each OFDM data symbol when all the OFDM data symbols within the preset time period are sent, where the second acquiring unit 603 is further configured to acquire received signals on the pilot subcarrier in each OFDM data symbol when all the OFDM data symbols within the preset time period are received.

The first acquiring unit 601 is specifically configured to:

acquire, according to the sent signals on the pilot subcarrier in each OFDM data symbol when all the OFDM data symbols within the preset time period are sent, the first set that includes the phases of each of the transmit antennas when all the OFDM data symbols within the preset time period are sent, where the transmit antennas send q OFDM data symbols within the preset time period, and when the $l^{th}$ OFDM data symbol of the q OFDM data symbols is sent, a phase $\theta_m(l)$ of the $m^{th}$ antenna of the transmit antennas satisfies:

$$\theta_m(l) = \theta_m(l-1) - \alpha \text{Im}\left[\sum_{k \in P}\left(e^{-j\theta_m(l-1)}(s_m^k(l))^* \sum_{n=1}^{N}(H_{nm}^k)^*(y_n^k(l)e^{-j\varphi_n^k(l-1)} - r_n^k(l))\right)\right],$$

where $\varphi_n(l-1)$ is a phase of the $n^{th}$ antenna of the receive antennas when the $(l-1)^{th}$ OFDM data symbol is received, where for the transmit antennas when the $l^{th}$ OFDM data symbol is received, $\varphi_n(l-1)$ is known and can be calculated by using a receive phase calculation formula when the $(l-1)^{th}$ OFDM data symbol is received, and an initial value $\varphi_n(0)$ is a value preset by a system and is usually set to 0; $\alpha$ is an empirical value and may be set to different values such as $10^{-6}$ or $10^{-4}$ according to different systems; Im is a mathematical symbol and indicates that an imaginary part of a value in brackets behind Im is used; P is a pilot subcarrier set, that is, when a summation operation is performed, the operation is performed only for a pilot subcarrier; e is a natural constant, a value of e is about 2.71828, $e^{-j\varphi_n(l-1)}$ in the formula is a complex number expression manner, and a specific meaning of $e^{-j\varphi_n(l-1)}$ is $e^{-j\varphi_n(l-1)} = \cos[\varphi_n(l-1)] - j\sin[\varphi_n(l-1)]$, where j is an imaginary unit; n is an integer that is greater than or equal to 1 and is less than or equal to N; N is a quantity of the receive antennas; m is an integer that is greater than or equal to 1 and is less than or equal to M; M is a quantity of antennas of the transmit antennas; $y_n^k(l)$ is a received signal of the $n^{th}$ antenna of the receive antennas on the $k^{th}$ pilot subcarrier when the $l^{th}$ OFDM data symbol is received; $s_m^k(l)$ is a sent signal of the $m^{th}$ antenna of the transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the receive antennas and the $m^{th}$ antenna of the transmit antennas; and $(r_n^k(l))^*$ refers to an adjoint matrix of the matrix $r_n^k(l)$, where the matrix $r_n^k(l)$ is a system parameter of the $n^{th}$ antenna of the receive antennas on the $k^{th}$ pilot subcarrier when the $l^{th}$ OFDM data symbol is received; $r_n^k(l)$ is obtained through calculation, and a calculation formula of is $r_n^k(l)$ is $$r_n^k(l) = \sum_{m=1}^{M} H_{nm} e^{j\theta_m^k(l-1)} s_m^k(l),$$

where $s_m^k(l)$ is the sent signal of the $m^{th}$ antenna of the transmit antennas on the $k^{th}$ pilot subcarrier when the $l^{th}$ OFDM data symbol is sent, $\theta_m^k(l-1)$ is a phase of the $m^{th}$ antenna of the transmit antennas when the $l-1^{th}$ OFDM data symbol is sent, and $H_{nm}^k$ is the channel over which the $k^{th}$ pilot subcarrier is sent between the $n^{th}$ antenna of the receive antennas and the $m^{th}$ antenna of the transmit antennas.

The first acquiring unit 601 is further configured to:

acquire, according to the received signals on the pilot subcarrier in each OFDM data symbol when all the OFDM data symbols within the preset time period are received, the second set that includes the phases of each of the receive antennas when all the OFDM data symbols within the preset time period are received, where the receive antennas receive q OFDM data symbols within the preset time period, and when the $l^{th}$ OFDM data symbol of the q OFDM data symbols is received, a phase $\varphi_n(l)$ of the $n^{th}$ antenna of the receive antennas satisfies:

$$\varphi_n(l) = \varphi_n(l-1) - \alpha \text{Im}\left[\sum_{k \in P}(y_n^k(l)e^{-j\varphi_n(l-1)}(r_n^k(l))^*)\right],$$

where $\alpha$ is an empirical value and may be set to different values such as $10^{-6}$ or $10^{-4}$ according to different systems; Im is a mathematical symbol and indicates that an imaginary part of a value in brackets behind Im is used; P is a pilot subcarrier set, that is, when a summation operation is performed, the operation is performed only for a pilot subcarrier; e is a natural constant, a value of e is about 2.71828, $e^{-j\varphi_n(l-1)}$ in the formula is a complex number expression manner, and a specific meaning of $e^{-j\varphi_n(l-1)}$ is $e^{-j\varphi_n(l-1)} = \cos[\varphi_n(l-1)] - j\sin[\varphi_n(l-1)]$, where j is an imaginary unit; n is an integer that is greater than or equal to 1 and is less than or equal to N; N is a quantity of the receive antennas; m is an integer that is greater than or equal to 1 and is less than or equal to M; M is a quantity of antennas of the transmit antennas; $y_n^k(l)$ is a received signal of the $n^{th}$ antenna of the receive antennas on the $k^{th}$ pilot subcarrier when the $l^{th}$ OFDM data symbol is received; $s_m^k(l)$ is a sent signal of the $m^{th}$ antenna of the transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the receive antennas and the $m^{th}$ antenna of the transmit antennas; and $(r_n^k(l))^*$ refers to an adjoint matrix of the matrix $r_n^k(l)$, where the matrix $r_n^k(l)$ is a system parameter of the $n^{th}$ antenna of the receive antennas on the $k^{th}$ pilot subcarrier when the $l^{th}$ OFDM data symbol is received; $r_n^k(l)$ is obtained through calculation, and a calculation formula of $r_n^k(l)$ is $$r_n^k(l) = \sum_{m=1}^{M} H_{nm} e^{j\theta_m^k(l-1)} s_m^k(l),$$

where $s_m^k(l)$ is the sent signal of the $m^{th}$ antenna of the transmit antennas on the $k^{th}$ pilot subcarrier when the $l^{th}$ OFDM data symbol is sent, $\theta_m^k(l-1)$ is a phase of the $m^{th}$ antenna of the transmit antennas when the $l-1^{th}$ OFDM data symbol is sent, and $H_{nm}^k$ is the channel over which the $k^{th}$ pilot subcarrier is sent between the $n^{th}$ antenna of the receive antennas and the $m^{th}$ antenna of the transmit antennas.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The receiving apparatus provided in this embodiment of the present disclosure is used in a MIMO-OFDM system in which receive antennas or transmit antennas do not share a common oscillator, where the processing unit performs phase noise compensation on received signals of the receive antennas within a preset time period by using phases of each of the transmit antennas within the preset time period and phases of each of the receive antennas within the preset time period, to obtain compensated signals. Compared with the prior art, the present disclosure improves precision of phase noise compensation, and effectively reduces cases of signal distortion.

An embodiment of the present disclosure provides a communications system, including:

the receiving apparatus according to any embodiment of the present disclosure, where receive antennas are disposed on the receiving apparatus, and the receiving apparatus is configured to: acquire a first set that includes phases of each of transmit antennas when all OFDM data symbols within a preset time period are sent, acquire a second set that includes phases of each of receive antennas when all the OFDM data symbols within the preset time period are received, and compensate received signals of each of the receive antennas according to the first set and the second set that are acquired by a first acquiring unit, to obtain compensated signals of each receive antenna; and a sending apparatus, where transmit antennas are disposed on the sending apparatus, which are configured to send signals to the receiving apparatus.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

The foregoing descriptions are merely specific implementable manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A signal processing method comprising:
   acquiring a plurality of sent signals on a pilot subcarrier when an $l^{th}$ Orthogonal Frequency Division Multiplexing (OFDM) data symbol is sent, wherein l is an integer greater than zero;
   acquiring a plurality of received signals on the pilot subcarrier when the $l^{th}$ OFDM data symbol is received;
   acquiring a phase of each of a plurality of transmit antennas when the $l^{th}$ OFDM data symbol is sent, wherein each of the plurality of transmit antennas use different oscillators, and wherein each of the plurality of transmit antennas have a different phase when the $l^{th}$ OFDM data symbol is sent;
   acquiring a phase of each of a plurality of receive antennas when the $l^{th}$ OFDM data symbol is received, wherein each of the plurality of receive antennas use different oscillators, and wherein each of the plurality of receive antennas have a different phase when the $l^{th}$ OFDM data symbol is received, wherein acquiring the phase of each of the plurality of receive antennas when the $l^{th}$ OFDM data symbol is received comprises:
   calculating, according to the plurality of sent signals on the pilot subcarrier and the plurality of received signals on the pilot subcarrier, and by using a receive phase calculation formula, the phase of each of the plurality of receive antennas when the $l^{th}$ OFDM data symbol is received, wherein the receive phase calculation formula is:

$$\varphi_n(l) = \varphi_n(l-1) - \alpha \mathrm{Im}\left[\sum_{k \in P}(y_n^k(l)e^{-j\varphi_n(l-1)}(r_n^k(l))^*)\right],$$

wherein $\varphi_n(l)$ is a phase of a $n^{th}$ antenna of the plurality of receive antennas when the $l^{th}$ OFDM data symbol is received; P is a pilot subcarrier set; n is an integer that is greater than or equal to 1 and is less than or equal to N; N is a quantity of the plurality of receive antennas; m is an integer that is greater than or equal to 1 and is less than or equal to M; M is a quantity of antennas of the plurality of transmit antennas; α is a preset coefficient; $y_n^k(l)$ is a received signal of the $n^{th}$ antenna of the plurality of receive antennas on a $k^{th}$ pilot subcarrier when the $l^{th}$ OFDM data symbol is received; and $r_n^k(l)$ is a system parameter of the $n^{th}$ antenna of the plurality of receive antennas on the $k^{th}$ pilot subcarrier when the $l^{th}$ OFDM data symbol is received; and compensating a received signal of each of the plurality of receive antennas according to the phase of each of the plurality of transmit antennas when the $l^{th}$ OFDM data symbol is sent and the phase of each of the plurality of receive antennas when the $l^{th}$ OFDM data symbol is received, to obtain a compensated signal of each of the plurality of receive antennas, wherein a first received signal of the plurality of received signals is compensated differently from a second received signal of the plurality of received signals.

2. The method according to claim 1, wherein acquiring the phase of each of the plurality of transmit antennas when the $l^{th}$ OFDM data symbol is sent, comprises:
   calculating, according to the plurality of sent signals on the pilot subcarrier and the plurality of received signals on the pilot subcarrier and by using a transmit phase calculation formula, the phase of each of the plurality of transmit antennas when the $l^{th}$ OFDM data symbol is sent, wherein the transmit phase calculation formula is:

$$\theta_m(l) = \theta_m(l-1) - \alpha \mathrm{Im}\left[\sum_{k \in P}\left(e^{-j\theta_m(l-1)}(s_m^k(l))^* \sum_{n=1}^{N}(H_{nm}^k)^*\left(y_n^k(l)e^{-j\varphi_n^k(l-1)} - r_n^k(l)\right)\right)\right],$$

wherein $\theta_m(l)$ is a phase of a $m^{th}$ antenna of the plurality of transmit antennas when the $l^{th}$ OFDM data symbol is sent; and $\varphi_n(l-1)$ is a phase of a $n^{th}$ antenna of the plurality of receive antennas when the $(l-1)^{th}$ OFDM data symbol is received; P is the pilot subcarrier set; n is the integer that is greater than or equal to 1 and is less than or equal to N; N is the quantity of the plurality of receive antennas; m is the integer that is greater than or equal to 1 and is less than or equal to M; M is the quantity of antennas of the plurality of transmit antennas; α is the preset coefficient; $y_n^k(l)$ is the received signal of the $n^{th}$ antenna of the plurality of receive antennas on the $k^{th}$ pilot subcarrier when the $l^{th}$ OFDM data symbol is received; $s_m^k(l)$ is a sent signal of the $m^{th}$ antenna of the plurality of transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the plurality of receive antennas and the $m^{th}$ antenna of the plurality of transmit antennas when the $l^{th}$ OFDM data symbol is transmitted; and $r_n^k(l)$ is the system parameter of the $n^{th}$ antenna of the plurality of receive antennas on the $k^{th}$ pilot subcarrier when the $l^{th}$ OFDM data symbol is received.

3. The method according to claim 1, wherein compensating the received signal of each of the plurality of receive antennas according to the phase of each of the plurality of transmit antennas when the $l^{th}$ OFDM data symbol is sent and the phase of each of the plurality of receive antennas when the $l^{th}$ OFDM data symbol is received, to obtain the compensated signal of each receive antenna comprises:

obtaining, according to a compensation formula and by using the phase of each of the plurality of transmit antennas when the $l^{th}$ OFDM data symbol is sent, the phase of each of the plurality of receive antennas when the $l^{th}$ OFDM data symbol is received, and received signals when the $l^{th}$ OFDM data symbol is received, the compensated signal of each of the plurality of receive antennas when the $l^{th}$ OFDM data symbol is received, wherein the compensation formula is:

$$Y^t(l) = \Phi(l) \cdot H^t \cdot \Theta(l) \cdot X^t(l) + ICI_l + z_l,$$

wherein $Y^t(l)$ is a matrix that comprises a received signal of each of the plurality of receive antennas on a $t^{th}$ subcarrier when the $l^{th}$ OFDM data symbol is received; $\Phi(l)$ is a matrix that comprises a phase of each of the plurality of receive antennas when the $l^{th}$ OFDM data symbol is received; $H^t$ is a channel between the plurality of receive antennas and the plurality of transmit antennas for the $t^{th}$ subcarrier when the $l^{th}$ OFDM data symbol is transmitted; $\Theta(l)$ is a matrix that comprises a phase of each of the plurality of transmit antennas when the $l^{th}$ OFDM data symbol is sent; $X^t(l)$ is a plurality of compensated signals on the $t^{th}$ subcarrier when the $l^{th}$ OFDM data symbol is received; $ICI_l$ is an inter-carrier interference matrix; and $z_l$ is a noise matrix.

4. A signal processing method comprising:
acquiring a plurality of sent signals on a pilot subcarrier in each Orthogonal Frequency Division Multiplexing (OFDM) data symbol of a plurality of OFDM symbols when all the plurality of OFDM data symbols within a preset time period are sent;
acquiring a plurality of received signals on the pilot subcarrier in each OFDM data symbol of the plurality of OFDM symbols when all the plurality of OFDM data symbols within the preset time period are received;
acquire, according to the plurality of sent signals on the pilot subcarrier in each OFDM data symbol when all the plurality of OFDM data symbols within the preset time period are sent, a first set of phases, wherein the first set of phases comprises the phases of each of a plurality of transmit antennas when all the plurality of OFDM data symbols within the preset time period are sent, wherein the plurality of transmit antennas send q OFDM data symbols within the preset time period, and when an $l^{th}$ OFDM data symbol of the q OFDM data symbols is sent, a phase $\theta_m(l)$ of a $m^{th}$ antenna of the transmit antennas satisfies:

$$\theta_m(l) = \theta_m(l-1) - \alpha \mathrm{Im}\left[\sum_{k \in P}\left(e^{-j\theta_m(l-1)}(s_m^k(l))^* \sum_{n=1}^{N}(H_{nm}^k)^*\left(y_n^k(l)e^{-j\varphi_n^k(l-1)} - r_n^k(l)\right)\right)\right],$$

wherein $\varphi_n(l-1)$ is a phase of a $n^{th}$ antenna of a plurality of receive antennas when the $(l-1)^{th}$ OFDM data symbol is received; P is a pilot subcarrier set; n is an integer that is greater than or equal to 1 and is less than or equal to N; N is a quantity of the plurality of receive antennas; m is an integer that is greater than or equal to 1 and is less than or equal to M; M is a quantity of antennas of the plurality of transmit antennas; α is a preset coefficient; $y_n^k(l)$ is a received signal of the $n^{th}$ antenna of the plurality of receive antennas on a $k^{th}$ pilot subcarrier when the $l^{th}$ OFDM data symbol is received; $s_m^k(l)$ is a sent signal of the $m^{th}$ antenna of the plurality of transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the plurality of receive antennas and the $m^{th}$ antenna of the plurality of transmit antennas when the $l^{th}$ OFDM data symbol is transmitted; and $r_n^k(l)$ is a system parameter of the $n^{th}$ antenna of the plurality of receive antennas on the $k^{th}$ pilot subcarrier when the $l^{th}$ OFDM data symbol is received;

acquiring a second set, the second set comprising a second plurality of phases, wherein each phase of the second plurality of phases corresponds to a phase of one of the plurality of receive antennas when an OFDM data symbol of the plurality of OFDM data symbols within a preset time period is received; and compensating a plurality of received signals of each of the plurality of receive antennas according to the first set and the second set, to obtain a plurality of compensated signals of each of the plurality of receive antennas.

5. The method according to claim 4, wherein acquiring the second set comprises:
acquiring the second set according to the plurality of received signals on the pilot subcarrier in each OFDM data symbol when all the plurality of OFDM data symbols within the preset time period are received,
wherein the plurality of receive antennas receive the q OFDM data symbols within the preset time period, and when a $l^{th}$ OFDM data symbol of the q OFDM data symbols is received, a phase $\varphi_n(l)$ of a $n^{th}$ antenna of the plurality of receive antennas satisfies:

$$\varphi_n(l) = \varphi_n(l-1) - \alpha \mathrm{Im}\left[\sum_{k \in P}(y_n^k(l)e^{-j\varphi_n(l-1)}(r_n^k(l))^*)\right],$$

wherein $\varphi_n(l)$ is a phase of the $n^{th}$ antenna of the plurality of receive antennas when the $l^{th}$ OFDM data symbol is received, where an initial value $\varphi_n(0)$ is a value preset by a system; P is the pilot subcarrier set; n is the integer that is greater than or equal to 1 and is less than or equal to N; N is the quantity of the plurality of receive antennas; m is the integer that is greater than or equal to 1 and is less than or equal to M; M is the quantity of antennas of the plurality of transmit antennas; α is the preset coefficient; $y_n^k(l)$ is the received signal of the $n^{th}$ antenna of the receive antennas on the $k^{th}$ pilot subcarrier when the $l^{th}$ OFDM data symbol is received; and $r_n^k(l)$ is the system parameter of the $n^{th}$ antenna of the plurality of receive antennas on the $k^{th}$ pilot subcarrier when the $l^{th}$ OFDM data symbol is received.

6. The method according to claim 4, wherein compensating the received signal of each of the plurality of receive antennas according to the first set and the second set, to obtain the compensated signal of each receive antenna comprises:

when the q OFDM data symbols are transmitted within the preset time period, wherein q is an integer greater than or equal to 1, and when a $l^{th}$ OFDM data symbol of the q OFDM data symbols is received, obtaining, according to a compensation formula and by using a phase of each of the plurality of transmit antennas that is the first set when the $l^{th}$ OFDM data symbol is sent, a phase of each of the plurality of receive antennas that is in the second set when the $l^{th}$ OFDM data symbol is received, and the plurality of received signals when the $l^{th}$ OFDM data symbol within the preset time period is received, the compensated signals when the $l^{th}$ OFDM data symbol is received, wherein the compensation formula is:

$$Y^t(l) = \Phi(l) \cdot H^t \cdot \Theta(l) \cdot X^t(l) + ICI_l + z_l,$$

wherein $Y^t(l)$ is a matrix that includes a received signal of each of the plurality of receive antennas on a $t^{th}$ subcarrier when the $l^{th}$ OFDM data symbol is received; l is an integer that is greater than or equal to 1 and is less than or equal to q; $\Phi(l)$ is a phase of each of the plurality of receive antennas when the $l^{th}$ OFDM data symbol is received; $H^t$ is a channel between the plurality of receive antennas and the plurality of transmit antennas for the $t^{th}$ subcarrier when the $l^{th}$ OFDM data symbol is transmitted; $\Theta(l)$ is a phase of each of the plurality of transmit antennas when the $l^{th}$ OFDM data symbol is sent; $X^t(l)$ is a plurality of compensated signals on the $t^{th}$ subcarrier when the $l^{th}$ OFDM data symbol is received; $ICI_l$ is an inter-carrier interference matrix; and $z_l$ is a noise matrix.

7. A receiving apparatus, comprising a processor and a non-transitory computer readable medium connected to the processor, and having stored thereon instructions that, when executed, cause the processor to:

acquire a phase of each of a plurality of transmit antennas when an $l^{th}$ Orthogonal Frequency Division Multiplexing (OFDM) data symbol is sent, wherein 1 is an integer greater than zero;

acquire a phase of each of a plurality of receive antennas when the $l^{th}$ OFDM data symbol is received; and obtain, according to a compensation formula and by using the phase of each of the plurality of transmit antennas when the $l^{th}$ OFDM data symbol is sent, the phase of each of the plurality of receive antennas when the $l^{th}$ OFDM data symbol is received, and a plurality of received signals when the $l^{th}$ OFDM data symbol is received, a plurality of compensated signals when the $l^{th}$ OFDM data symbol is received, wherein the compensation formula is:

$$Y^t(l) = \Phi(l) \cdot H^t \cdot \Theta(l) \cdot X^t(l) + ICI_l + z_l,$$

wherein $Y^t(l)$ is a matrix that comprises a received signal of each of the plurality of receive antennas on a $t^{th}$ subcarrier when the $l^{th}$ OFDM data symbol is received; $\Phi(l)$ is a matrix that comprises a phase of each of the plurality of receive antennas when the $l^{th}$ OFDM data symbol is received; $H^t$ is a channel between the plurality of receive antennas and the plurality of transmit antennas for the $t^{th}$ subcarrier when the $l^{th}$ OFDM data symbol is transmitted; $\Theta(l)$ is a matrix that comprises a phase of each of the plurality of transmit antennas when the $l^{th}$ OFDM data symbol is sent; $X^t(l)$ is a plurality of compensated signals on the $t^{th}$ subcarrier when the $l^{th}$ OFDM data symbol is received; $ICI_l$ is an inter-carrier interference matrix; and $z_l$ is a noise matrix.

8. The receiving apparatus according to claim 7, wherein the stored instructions when executed further cause the processor to:

acquire a plurality of sent signals on a pilot subcarrier when the $l^{th}$ OFDM data symbol is sent; and acquire a plurality of received signals on the pilot subcarrier when the $l^{th}$ OFDM data symbol is received.

9. The receiving apparatus according to claim 8, wherein the stored instructions when executed further cause the processor to:

calculate, according to the plurality of sent signals on the pilot subcarrier and the plurality of received signals on the pilot subcarrier and by using a transmit phase calculation formula, the phase of each of the plurality of transmit antennas when the $l^{th}$ OFDM data symbol is sent, wherein the transmit phase calculation formula is:

$$\theta_m(l) = \theta_m(l-1) - \alpha \mathrm{Im}\left[\sum_{k \in P}\left(e^{-j\theta_m(l-1)}(s_m^k(l))^* \sum_{n=1}^{N}(H_{nm}^k)^*\left(y_n^k(l)e^{-j\varphi_n^k(l-1)} - r_n^k(l)\right)\right)\right],$$

wherein $\theta_m(l)$ is a phase of a $m^{th}$ antenna of the plurality of transmit antennas when the $l^{th}$ OFDM data symbol is sent; $\varphi_n(l-1)$ is a phase of a $n^{th}$ antenna of the plurality of receive antennas when the $(l-1)^{th}$ OFDM data symbol is received; P is a pilot subcarrier set; n is an integer that is greater than or equal to 1 and is less than or equal to N; N is a quantity of the plurality of receive antennas; m is an integer that is greater than or equal to 1 and is less than or equal to M; M is a quantity of the plurality of antennas of the transmit antennas; α is a preset coefficient; $y_n^k(l)$ is a received signal of the $n^{th}$ antenna of the plurality of receive antennas on a $k^{th}$ pilot subcarrier when the $l^{th}$ OFDM data symbol is received; $s_m^k(l)$ is a sent signal of the $m^{th}$ antenna of the plurality of transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the plurality of receive antennas and the $m^{th}$ antenna of the plurality of transmit antennas when the $l^{th}$ OFDM data symbol is transmitted; and $r_n^k(l)$ is a system parameter of the $n^{th}$ antenna of the plurality of receive antennas on the $k^{th}$ pilot subcarrier when the $l^{th}$ OFDM data symbol is received.

10. The receiving apparatus according to claim 8, wherein the stored instructions when executed further cause the processor to:

calculate, according to the plurality of sent signals on the pilot subcarrier and the plurality of received signals on the pilot subcarrier and by using a receive phase calculation formula, the phase of each of the plurality of receive antennas when the $l^{th}$ OFDM data symbol is received, wherein the receive phase calculation formula is:

$$\varphi_n(l) = \varphi_n(l-1) - \alpha \text{Im}\left[\sum_{k \in P} (y_n^k(l) e^{-j\varphi_n(l-1)} (r_n^k(l))^*)\right],$$

wherein $\varphi_n(l)$ is a phase of a $n^{th}$ antenna of the plurality of receive antennas when the $l^{th}$ OFDM data symbol is received; P is a pilot subcarrier set; n is an integer that is greater than or equal to 1 and is less than or equal to N; N is a quantity of the plurality of receive antennas; m is an integer that is greater than or equal to 1 and is less than or equal to M; M is a quantity of the plurality of antennas of the transmit antennas; $\alpha$ is a preset coefficient; $y_n^k(l)$ is a received signal of the $n^{th}$ antenna of the plurality of receive antennas on a $k^{th}$ pilot subcarrier when the $l^{th}$ OFDM data symbol is received; and $r_n^k(l)$ is a system parameter of the $n^{th}$ antenna of the plurality of receive antennas on the $k^{th}$ pilot subcarrier when the $l^{th}$ OFDM data symbol is received.

11. A receiving apparatus, comprising a processor and a non-transitory computer readable medium connected to the processor, and having stored thereon instructions that, when executed, cause the processor to:
acquire a plurality of sent signals on a pilot subcarrier in each Orthogonal Frequency Division Multiplexing (OFDM) data symbol of a plurality of OFDM symbols when all the plurality of OFDM data symbols within a preset time period are sent;
acquire a plurality of received signals on the pilot subcarrier in each OFDM data symbol of the plurality of OFDM symbols when all the plurality of OFDM data symbols within the preset time period are received;
acquire, according to the plurality of sent signals on the pilot subcarrier in each OFDM data symbol when all the plurality of OFDM data symbols within the preset time period are sent, a first set of phases, wherein the first set of phases comprises the phases of each of a plurality of transmit antennas when all the plurality of OFDM data symbols within the preset time period are sent, wherein the plurality of transmit antennas send q OFDM data symbols within the preset time period, and when an $l^{th}$ OFDM data symbol of the q OFDM data symbols is sent, a phase $\theta_m(l)$ of a $m^{th}$ antenna of the transmit antennas satisfies:

$$\theta_m(l) = $$
$$\theta_m(l-1) - \alpha \text{Im}\left[\sum_{k \in P}\left(e^{-j\theta_m(l-1)} (s_m^k(l))^* \sum_{n=1}^{N} (H_{nm}^k)^* (y_n^k(l) e^{-j\varphi_n^k(l-1)} - r_n^k(l))\right)\right],$$

wherein $\varphi_n(l-1)$ is a phase of a $n^{th}$ antenna of a plurality of receive antennas when the $(l-1)^{th}$ OFDM data symbol is received; P is a pilot subcarrier set; n is an integer that is greater than or equal to 1 and is less than or equal to N; N is a quantity of the plurality of receive antennas; m is an integer that is greater than or equal to 1 and is less than or equal to M; M is a quantity of antennas of the plurality of transmit antennas; $\alpha$ is a preset coefficient; $y_n^k(l)$ is a received signal of the $n^{th}$ antenna of the plurality of receive antennas on a $k^{th}$ pilot subcarrier when the $l^{th}$ OFDM data symbol is received; $s_m^k(l)$ is a sent signal of the $m^{th}$ antenna of the plurality of transmit antennas on the $k^{th}$ pilot subcarrier when the $l^{th}$ OFDM data symbol is sent; $H_{nm}^k$ is a channel over which the $k^{th}$ pilot subcarrier is sent between the $n^{th}$ antenna of the plurality of receive antennas and the $m^{th}$ antenna of the plurality of transmit antennas when the $l^{th}$ OFDM data symbol is transmitted; and $r_n^k(l)$ is a system parameter of the $n^{th}$ antenna of the plurality of receive antennas on the $k^{th}$ pilot subcarrier when the $l^{th}$ OFDM data symbol is received;
acquire a second set, the second set comprising a plurality of phases of each of the plurality of receive antennas when all the plurality of OFDM data symbols within the preset time period are received; and
compensate a plurality of received signals of each of the plurality of receive antennas according to the first set and the second set, to obtain a plurality of compensated signals of each of the plurality of receive antennas.

12. The receiving apparatus according to claim 11, wherein the stored instructions when executed further cause the processor to:
acquire, according to the plurality of received signals on the pilot subcarrier in each OFDM data symbol when all the plurality of OFDM data symbols within the preset time period are received, the second set that comprises the plurality of phases of each of the plurality of receive antennas when all the plurality of OFDM data symbols within the preset time period are received,
wherein the plurality of receive antennas receive the q OFDM data symbols within the preset time period, and when the $l^{th}$ OFDM data symbol of the q OFDM data symbols is received, a phase $\varphi_n(l)$ of a $n^{th}$ antenna of the plurality of receive antennas satisfies:

$$\varphi_n(l) = \varphi_n(l-1) - \alpha \text{Im}\left[\sum_{k \in P} (y_n^k(l) e^{-j\varphi_n(l-1)} (r_n^k(l))^*)\right],$$

wherein $\varphi_n(l)$ is a phase of a $n^{th}$ antenna of the plurality of receive antennas when the $l^{th}$ OFDM data symbol is received, and wherein an initial value $\varphi_n(0)$ is a value preset by a system; P is the pilot subcarrier set; n is the integer that is greater than or equal to 1 and is less than or equal to N; N is the quantity of the receive antennas; m is the integer that is greater than or equal to 1 and is less than or equal to M; M is the quantity of antennas of the plurality of transmit antennas; $\alpha$ is the preset coefficient; $y_n^k(l)$ is the received signal of the $n^{th}$ antenna of the plurality of receive antennas on a $k^{th}$ pilot subcarrier when the $l^{th}$ OFDM data symbol is received; and $r_n^k(l)$ is the system parameter of the $n^{th}$ antenna of the plurality of receive antennas on the $k^{th}$ pilot subcarrier when the $l^{th}$ OFDM data symbol is received.

13. The receiving apparatus according to claim 11, wherein the stored instructions when executed further cause the processor to:
when the $l^{th}$ OFDM data symbol of the q OFDM data symbols is received, obtain, according to a compensation formula and by using a phase of each of the plurality of transmit antennas that is in the first set when the $l^{th}$ OFDM data symbol is sent, a phase of each of the plurality of receive antennas that is in the second set when the $l^{th}$ OFDM data symbol is received, and the plurality of received signals when the $l^{th}$ OFDM data symbol within the preset time period is received, the plurality of compensated signals when the $l^{th}$ OFDM data symbol is received, wherein the compensation formula is:

$$Y^t(l) = \Phi(l) \cdot H^t \cdot \Theta(l) \cdot X^t(l) + \mathrm{ICI}_l + z_l,$$

wherein l is an integer that is greater than or equal to 1 and is less than or equal to q; $\Phi(l)$ is a phase of each of the plurality of receive antennas when the $l^{th}$ OFDM data symbol is received; $H^t$ is a channel between the plurality of receive antennas and the plurality of transmit antennas for a $t^{th}$ subcarrier when the $l^{th}$ OFDM data symbol is transmitted; $\Theta(l)$ is a phase of each of the plurality of transmit antennas when the $l^{th}$ OFDM data symbol is sent; $X^t(l)$ is a compensated signal on the $t^{th}$ subcarrier when the $l^{th}$ OFDM data symbol is received; $\mathrm{ICI}_l$ is an inter-carrier interference matrix; and $z_l$ is a noise matrix.

* * * * *